US012405565B2

(12) United States Patent
Kawakami et al.

(10) Patent No.: US 12,405,565 B2
(45) Date of Patent: Sep. 2, 2025

(54) CARTRIDGE INCLUDING A DEVELOPER STORAGE UNIT FOR STORING DEVELOPER

(71) Applicant: CANON KABUSHIKI KAISHA, Tokyo (JP)

(72) Inventors: Takuya Kawakami, Mishima (JP); Naoya Asanuma, Susono (JP); Tetsuya Numata, Suntou-gun (JP); Noriyuki Komatsu, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/359,266

(22) Filed: Jul. 26, 2023

(65) Prior Publication Data

US 2023/0367258 A1 Nov. 16, 2023

Related U.S. Application Data

(63) Continuation of application No. 17/883,132, filed on Aug. 8, 2022, now Pat. No. 11,762,326, which is a (Continued)

(30) Foreign Application Priority Data

Apr. 26, 2019 (JP) ................................ 2019-086877

(51) Int. Cl.
*G03G 21/16* (2006.01)
*G03G 21/18* (2006.01)

(52) U.S. Cl.
CPC ..... *G03G 21/1647* (2013.01); *G03G 21/1676* (2013.01); *G03G 21/1821* (2013.01); *G03G 21/1633* (2013.01); *G03G 2221/1869* (2013.01)

(58) Field of Classification Search
CPC ........... G03G 21/1633; G03G 21/1647; G03G 21/1676; G03G 21/1821; G03G 2221/1821; G03G 2221/1869
See application file for complete search history.

(56) References Cited

U.S. PATENT DOCUMENTS 5,911,096 A 6/1999 Batori
6,115,571 A 9/2000 Kobayashi
(Continued)

FOREIGN PATENT DOCUMENTS

JP H04156469 A 5/1992
JP 08286489 A 11/1996
(Continued)

OTHER PUBLICATIONS

Office Action issued in U.S. Appl. No. 16/847,743 mailed on Sep. 1, 2020.
(Continued)

*Primary Examiner* — Hoang X Ngo
(74) *Attorney, Agent, or Firm* — ROSSI, KIMMS & McDOWELL LLP

(57) ABSTRACT

A cartridge is mountable in and dismountable from a main assembly of an image forming apparatus, in which the main assembly includes an opening and an openable member including a discriminating portion. The cartridge includes a process unit including a rotatable photosensitive member and a developing roller configured to supply toner to the photosensitive member, and a developer storage unit configured to store a developer. The developer storage unit is provided with a discharge opening for permitting discharge of the stored developer to the process unit and is mountable to and dismountable from the process unit. The developer storage unit is provided with a portion-to-be-discriminated provided so as to be engaged with the discriminating portion of the openable member when the cartridge is mounted in
(Continued)

the main assembly and the openable member is in a closed position.

8 Claims, 20 Drawing Sheets

Related U.S. Application Data continuation of application No. 16/847,743, filed on Apr. 14, 2020, now Pat. No. 11,435,689.

(56) References Cited

U.S. PATENT DOCUMENTS

| | | | | |
|---|---|---|---|---|
| 7,382,988 | B2 | 6/2008 | Nakazato | |
| 7,551,860 | B2 | 6/2009 | Kawai | |
| 10,042,321 | B2 | 8/2018 | Abe | |
| 11,435,689 | B2 | 9/2022 | Kawakami et al. | |
| 2005/0111858 | A1 | 5/2005 | Nakazato | |
| 2008/0075506 | A1 | 3/2008 | Sato | |
| 2008/0199204 | A1 | 8/2008 | Ishii et al. | |
| 2010/0247159 | A1* | 9/2010 | Imai | G03G 15/0855 399/262 |
| 2015/0055974 | A1 | 2/2015 | Hoashi et al. | |
| 2017/0139372 | A1 | 5/2017 | Kaisha | |
| 2018/0052407 | A1* | 2/2018 | Eto | G03G 15/0886 |

FOREIGN PATENT DOCUMENTS

| | | | |
|---|---|---|---|
| JP | 10228222 | A | 8/1998 |
| JP | 2000284579 | A | 10/2000 |
| JP | 2005128414 | A | 5/2005 |
| JP | 2008129141 | A | 6/2008 |
| JP | 2008276138 | A | 11/2008 |
| JP | 2009210615 | A | 9/2009 |
| JP | 2018010243 | A | 1/2018 |
| JP | 2019020693 | A | 2/2019 |
| JP | 7433777 | B2 | 2/2024 |

OTHER PUBLICATIONS

Notice of Allowance issued in U.S. Appl. No. 16/847,743 mailed on Mar. 23, 2021.
Office Action issued in U.S. Appl. No. 16/847,743 mailed on Aug. 9, 2021.
Office Action issued in U.S. Appl. No. 16/847,743 mailed on Jan. 27, 2022.
Notice of Allowance issued in U.S. Appl. No. 16/847,743 mailed on May 12, 2022.
Office Action issued in Japanese Appln. No. 2019-086877 mailed Feb. 7, 2023.
Office Action issued in Japanese Appln. No. 2019-086877 mailed on May 30, 2023.
Office Action issued in U.S. Appl. No. 17/883,132 mailed on Dec. 5, 2022.
Notice of Allowance issued U.S. Appl. No. 17/883,132 mailed on May 12, 2023.

* cited by examiner (a)

(b)

(c)

(a)

(b)

(c)

CARTRIDGE INCLUDING A DEVELOPER STORAGE UNIT FOR STORING DEVELOPER

FIELD OF THE INVENTION AND RELATED ART

The present invention relates to a cartridge including a developer storage unit for storing a developer.

In a laser beam printer and a copying machine as an image forming apparatus of an electrophotographic type, a developer image is formed on a photosensitive member and then is transferred onto a sheet as a recording material, so that an image is formed on the recording material.

In the laser beam printer, in order to facilitate maintenance, a part of components of the image forming apparatus is provided in a cartridge, and a cartridge is taken out of an apparatus main assembly of the laser beam printer, and then maintenance or exchange (replacement) is performed. Such a type has been widely employed.

Conventionally, as such a cartridge, a drum cartridge including a photosensitive drum and a drum frame rotatably supporting this photosensitive drum has been proposed (Japanese Laid-Open Application (JP-A) 2018-10243). This drum cartridge is constituted so that in a first state in which a developing device including a developing roller is mounted in the drum frame, a toner cartridge is mountable in and dismountable from the developing device.

Further, a structure such that an adapting member is mounted to a casing of an image forming unit and the resultant image forming unit can be mounted in only a corresponding image forming apparatus has been disclosed (JP-A H4-156469).

However, for example, when the adapting member as disclosed in JP-A H4-156469 is mounted to the drum frame of the drum cartridge to which the toner cartridge is detachably mountable as disclosed in JP-A 2018-10243, there is a need to design the toner cartridge so as to avoid this adapting member. As a result, for example, a volume of the toner cartridge is restricted in some cases.

SUMMARY OF THE INVENTION

According to an aspect of the present invention, there is provided a cartridge mountable in and dismountable from a main assembly of an image forming apparatus, in which the main assembly includes an opening through which the cartridge passes during mounting and dismounting of the cartridge and includes an openable member which is movable between an open position where the openable member is opened to expose the opening and a closed position where the openable member is closed to cover the opening and which includes a discriminating portion, the cartridge comprising: a process unit including a rotatable photosensitive member and a developing roller configured to supply toner to the photosensitive member; and a developer storage unit configured to store a developer, wherein the developer storage unit is provided with a discharge opening configured to allow discharge of the stored developer to the process unit and is mountable to and dismountable from the process unit, wherein the developer storage unit is provided with a portion-to-be-discriminated provided so as to be engaged with the discriminating portion of the openable member when the cartridge is mounted in the main assembly and the openable member is in the closed position.

According to another aspect of the present invention, there is provided a cartridge mountable in and dismountable from a main assembly of an image forming apparatus, in which the main assembly includes an opening through which the cartridge passes during mounting and dismounting of the cartridge, an openable member which is movable between an open position where the opening opens and a closed position where the openable member closes the opening and which includes a discriminating portion, and a process unit including a rotatable photosensitive member and a developing roller configured to supply toner to the photosensitive member, the cartridge comprising: a developer storage unit configured to store a developer, wherein the developer storage unit is provided with a discharge opening permitting discharge of the stored developer to the process unit and is mountable to and dismountable from the process unit, wherein the developer storage unit is provided with a portion-to-be-discriminated provided so as to be engaged with the discriminating portion of the openable member when the cartridge is mounted in the main assembly and the openable member is in the closed position.

Further features of the present invention will become apparent from the following description of exemplary embodiments with reference to the attached drawings.

Figure 15:
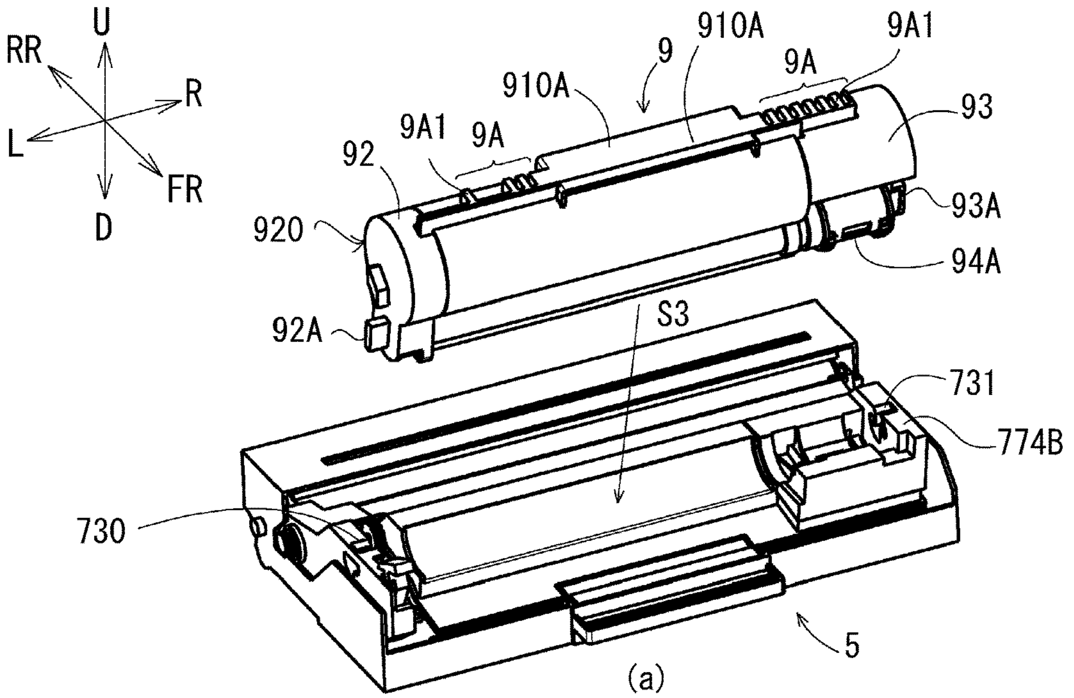
Figure 15:
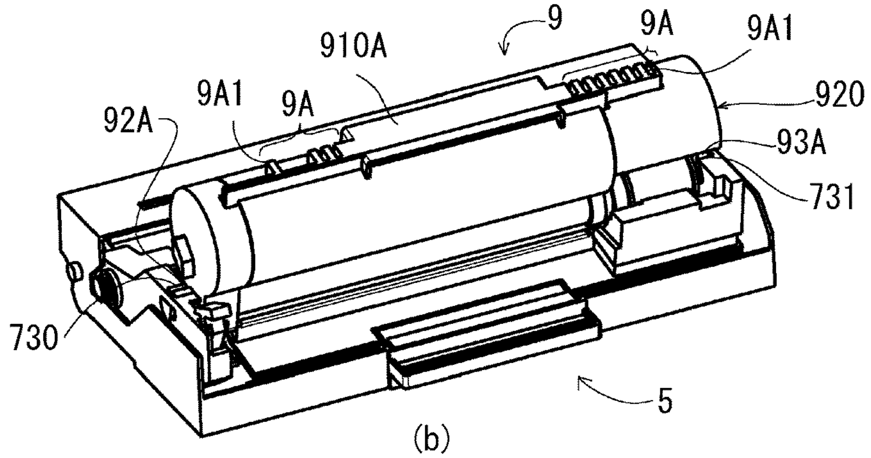
Figure 15:
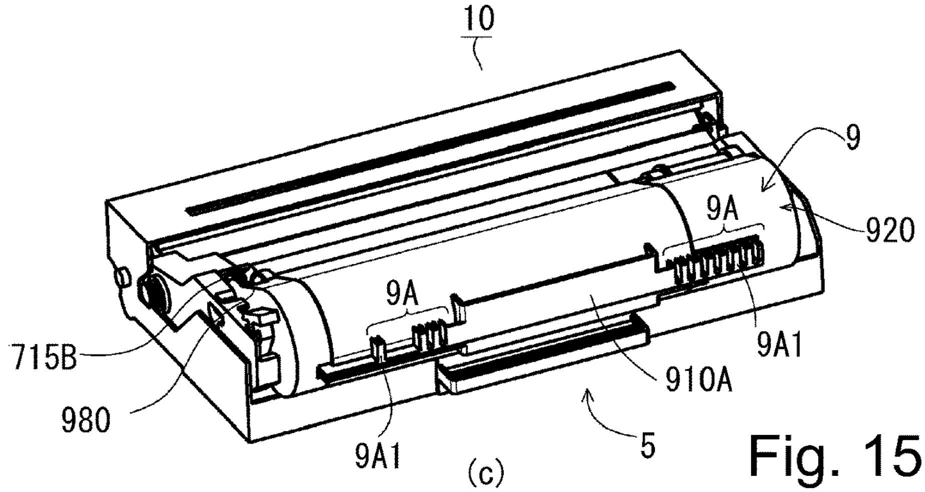

Parts (a), (b) and (c) of FIG. 15 are perspective views of the developer storage unit and the process unit.

Figure 16:
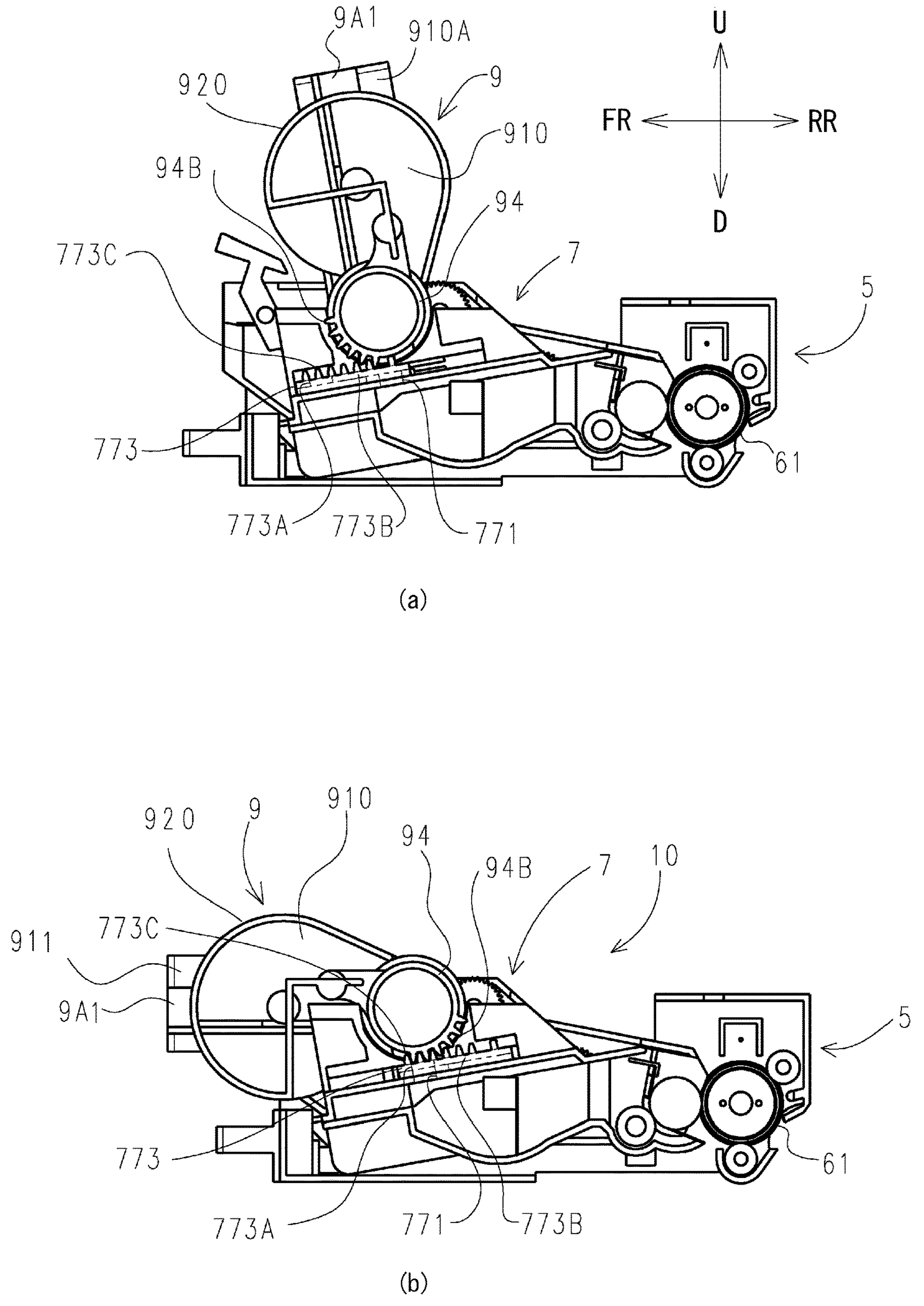

Parts (a) and (b) of FIG. 16 are schematic views showing an open/close operation of a receiving-side shutter of the developing unit.

Figure 17:
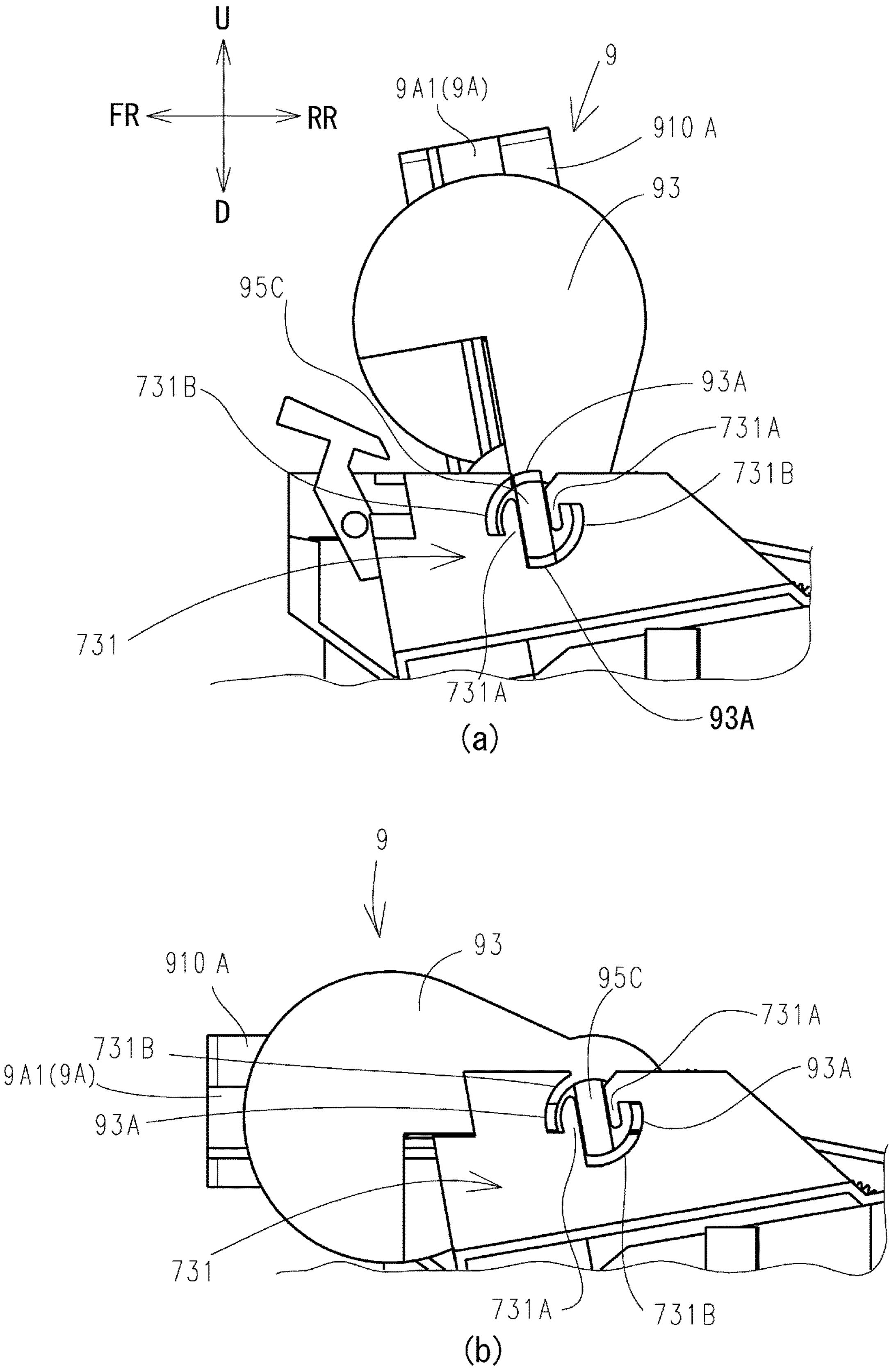

Parts (a) and (b) of FIG. 17 are schematic views showing an open/close operation of a discharge-side shutter of the developing unit.

Figure 18:
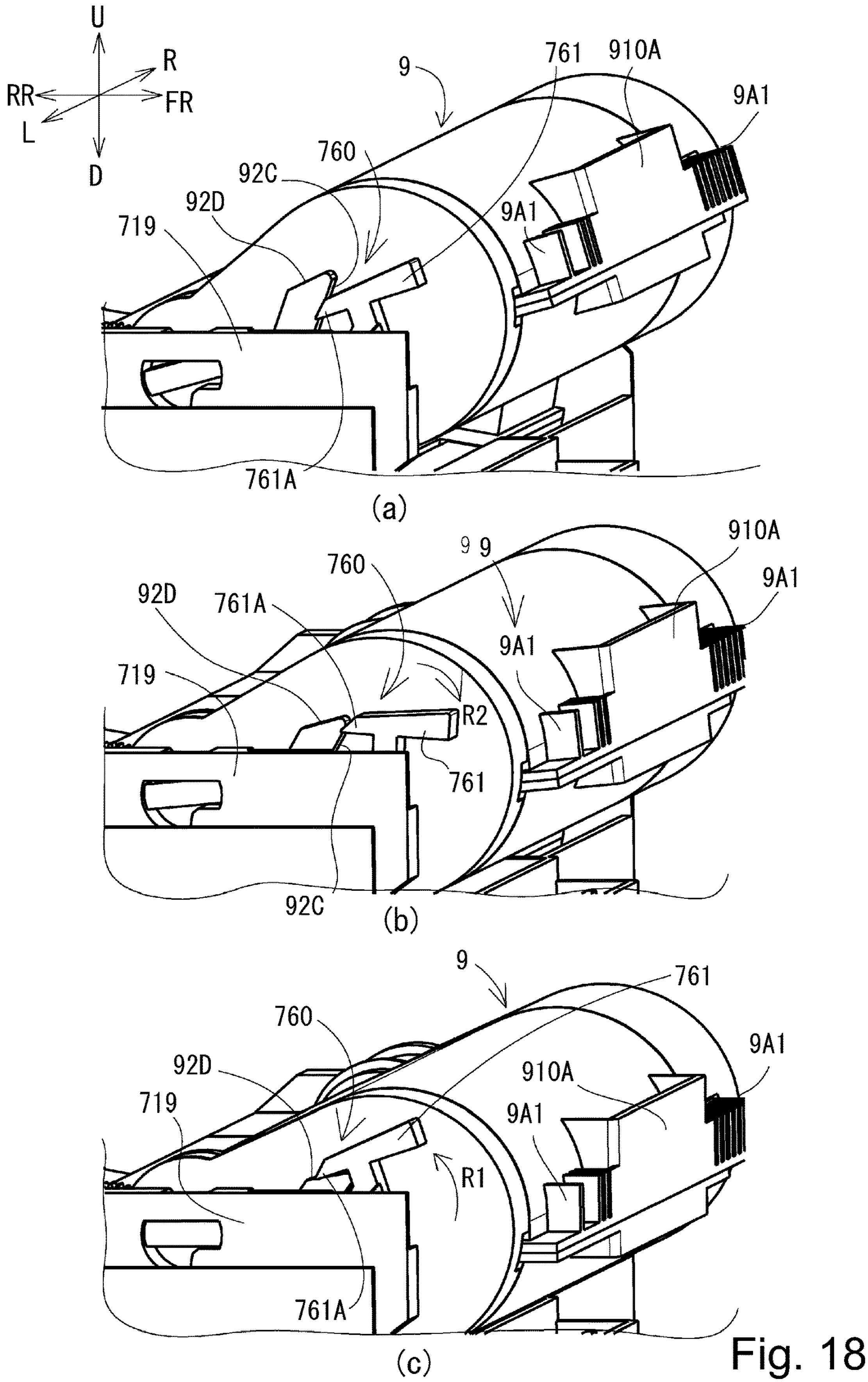

Parts (a), (b) and (c) of FIG. 18 are schematic views showing an operation of a lift mechanism in a process in which the developer storage unit is mounted.

Figure 19:
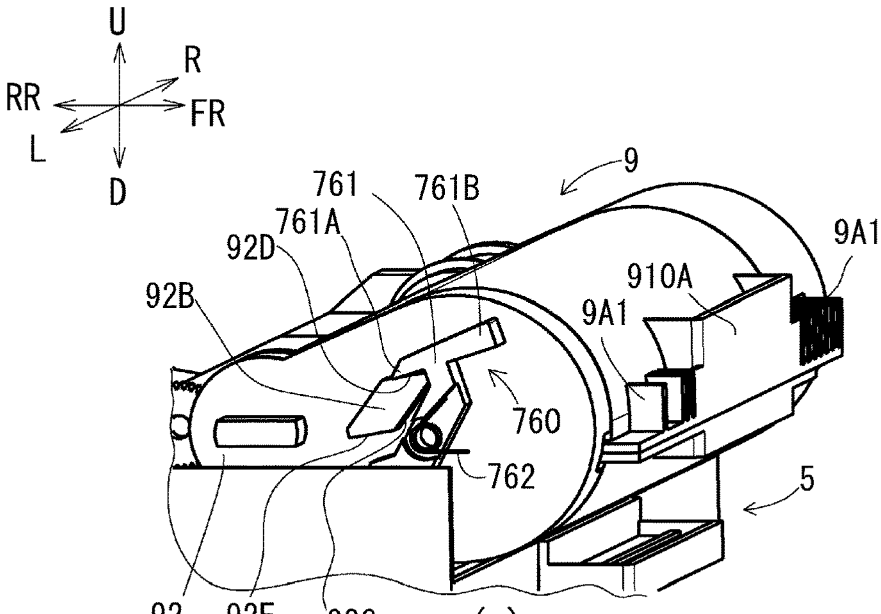
Figure 19:
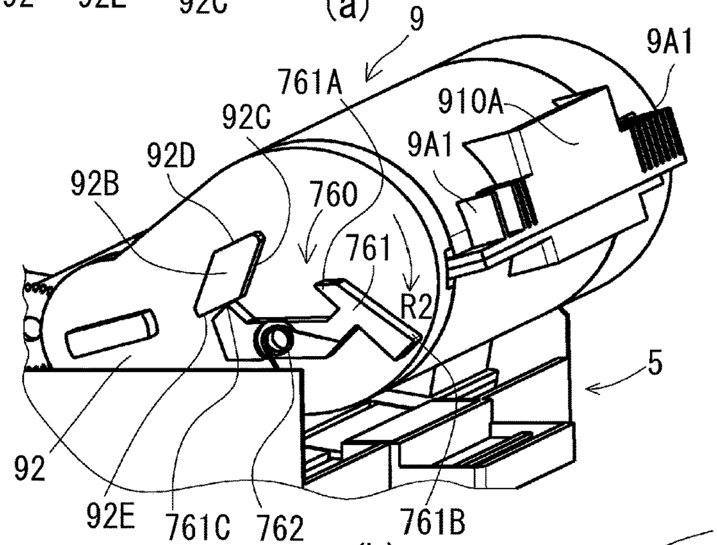
Figure 19:
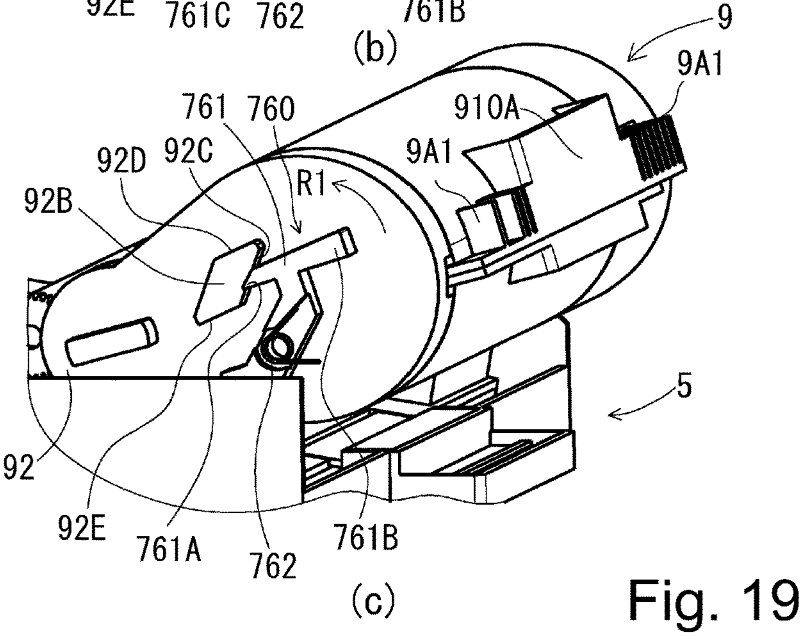

Parts (a), (b) and (c) of FIG. 19 are schematic views showing an operation of the lift mechanism in a process in which the developer storage unit is put in a lift-up state.

Figure 20:
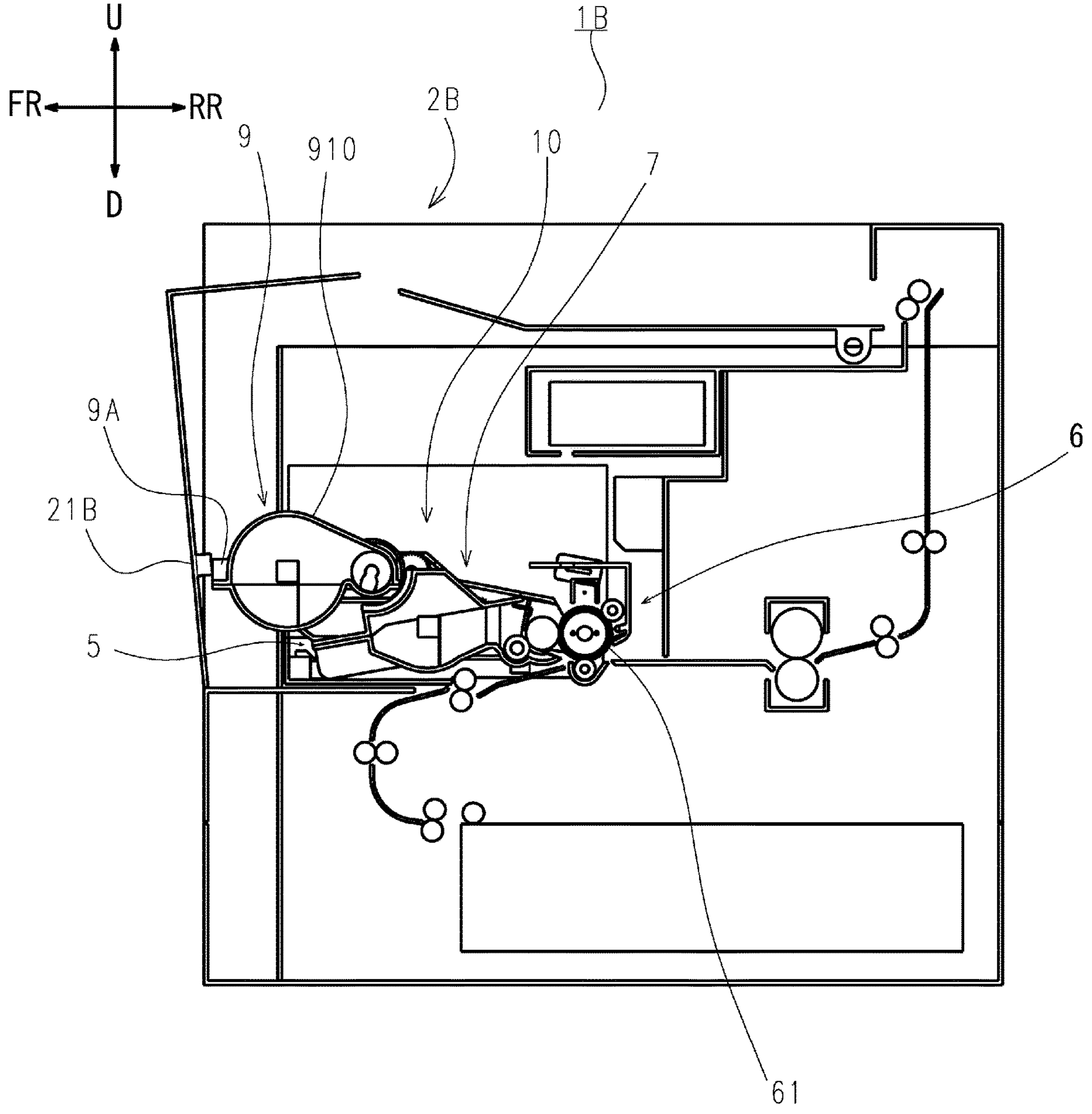

FIG. 20 is a sectional view showing a state in which the process cartridge is mounted in a second image forming apparatus which is not adaptable to the process cartridge.

DESCRIPTION OF EMBODIMENTS

In the following, an embodiment of the present invention will be specifically described with reference to the drawings.

Incidentally, in the following description, directions based on a user using an image forming apparatus 1A which is a first image forming apparatus are defined. That is, as regards the image forming apparatus 1A, a front surface side is defined as a “front” (side), a rear surface side is defined as a “rear” (side), an upper surface (top surface) side is defined as an “up (upper)” (side), and a lower surface (bottom surface) side is defined as a “down (lower)” side. Further, when the image forming apparatus 1A is seen from the front surface side, a left side of the image forming apparatus 1A is defined as a “left” (side), and a right side of the image forming apparatus 1A is defined as a “right” (side). Also as regards a process unit 5, a developer storage unit 9 and a process cartridge 10, these members are regarded as those in attitudes which are the same as attitude thereof in a state in which these members are mounted in the image forming apparatus 1A, and the directions thereof are defined similarly as in the case of the image forming apparatus 1A. The respective directions in the respective drawings are defined by arrows indicated in the drawings. The front-rear direction, the up-down direction and the left-right direction which are indicated by arrows are perpendicular to each other. These directions are common to all the drawings. The up-down direction is parallel to a vertical direction, and the left-right direction and the front-rear direction are parallel to a horizontal direction. Further, the left-right direction is parallel to each of a rotational axis direction of a photosensitive member 61 and a rotational axis direction of a developing roller 71.

Further, a structure in which a developing unit 7 is mounted on a photosensitive (member) unit 6 and thus these units are integrally assembled into a unit is referred to as the process unit 5. To the process unit 5, the developer storage unit 9 for supplying a developer to the developing unit 7 is provided so as to be detachably mountable. Further, a structure in which the developer storage unit 9 is mounted on the process unit 5 and thus these units are integrally assembled into a unit is referred to as the process cartridge 10. A mounting direction S1 and a dismounting direction S2 when this process cartridge 10 is mounted in the image forming apparatus 1A are parallel to the front-rear direction and is perpendicular to the left-right direction and the up-down direction.

[General Structure of Image Forming Apparatus]

Figure 1:
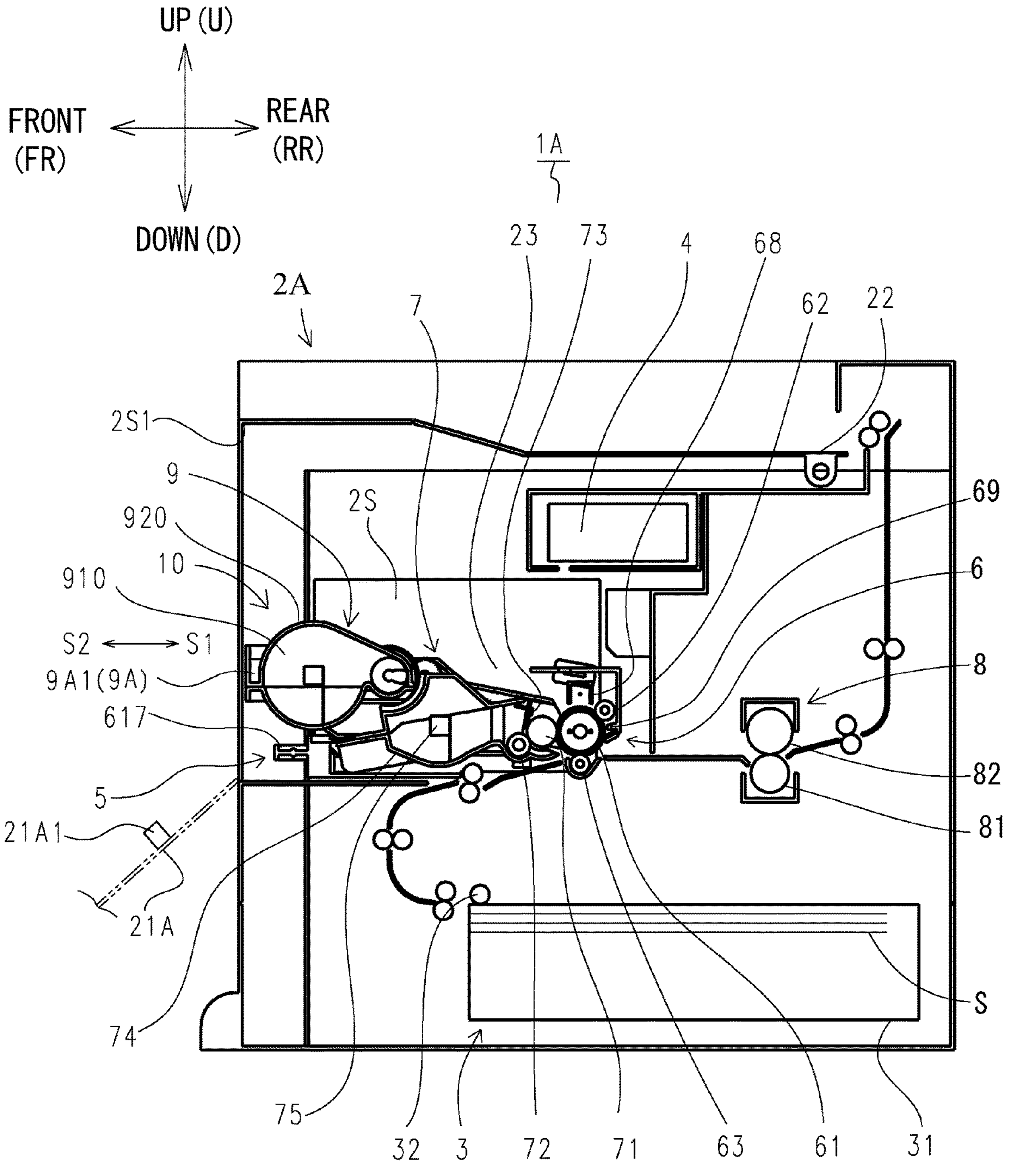
FIG. 1 is a sectional view of a first image forming apparatus including a process cartridge.

FIG. 1 is a sectional view of an image forming apparatus 1A in which the process cartridge 10 is mounted, and a cross-section thereof is parallel to the up-down direction and the font-rear direction. As shown in FIG. 1, the image forming apparatus 1A principally includes a sheet feeding portion 3 for supplying (feeding) a sheet S into a first image forming apparatus main assembly 2A, an exposure device 4, the process cartridge 10 for transferring a developer image onto the sheet S, and a fixing device 8 for heat-fixing the transferred developer image.

The sheet feeding portion is provided at a lower portion in the image forming apparatus main assembly 2A and principally includes a sheet feeding tray 31 and a sheet feeding mechanism 32. The sheet S accommodated in the sheet feeding tray 31 is supplied (fed) toward the process cartridge 10 (between the photosensitive member 61 and a transfer roller 63) by the sheet feeding mechanism 32.

The exposure device 4 is provided at an upper portion in the image forming apparatus main assembly 2A and includes an unshown laser light emitting portion, and a polygonal mirror, a lens, a reflecting mirror and the like from which reference numerals or symbols are omitted. The exposure device 4 exposes the surface of the photosensitive member 61 to laser light by high-speed scanning of the surface of the photosensitive member 61 with the laser light which is emitted from the laser light emitting portion and which is based on image data.

The process cartridge 10 is provided below the exposure device 4. The process cartridge 10 has a structure such that the process cartridge 10 is inserted into an accommodating portion 23 in the mounting direction S1 through an opening formed when a first openable member 21A provided to the image forming apparatus main assembly 2A is opened (chain double-dashed line of FIG. 1) and is mounted in the image forming apparatus main assembly 2A. Further, in the case where the process cartridge 10 is dismounted from the accommodating portion 23 of the image forming apparatus main assembly 2A, the process cartridge 10 can be dismounted by being moved in the dismounting direction S2 opposite to the mounting direction S1.

This process cartridge 10 comprises the process unit 5 and the developer storage unit 9, and the process unit 5 principally includes the photosensitive unit 6 and the developing unit 7. The photosensitive unit 6 principally includes the photosensitive member 61, a corona charger 68, a pre-exposure portion 69, a collecting roller 62 and the transfer roller 63. The developing unit 7 is mounted to the photosensitive unit 6. The developing unit 7 principally includes the developing roller 71, a supplying roller 72, a layer thickness regulating blade 73, a first developer storage portion 74 storing the developer, and a first stirring member 75 provided in the first developer storage portion 74.

[Image Forming Process]

Figure 5:
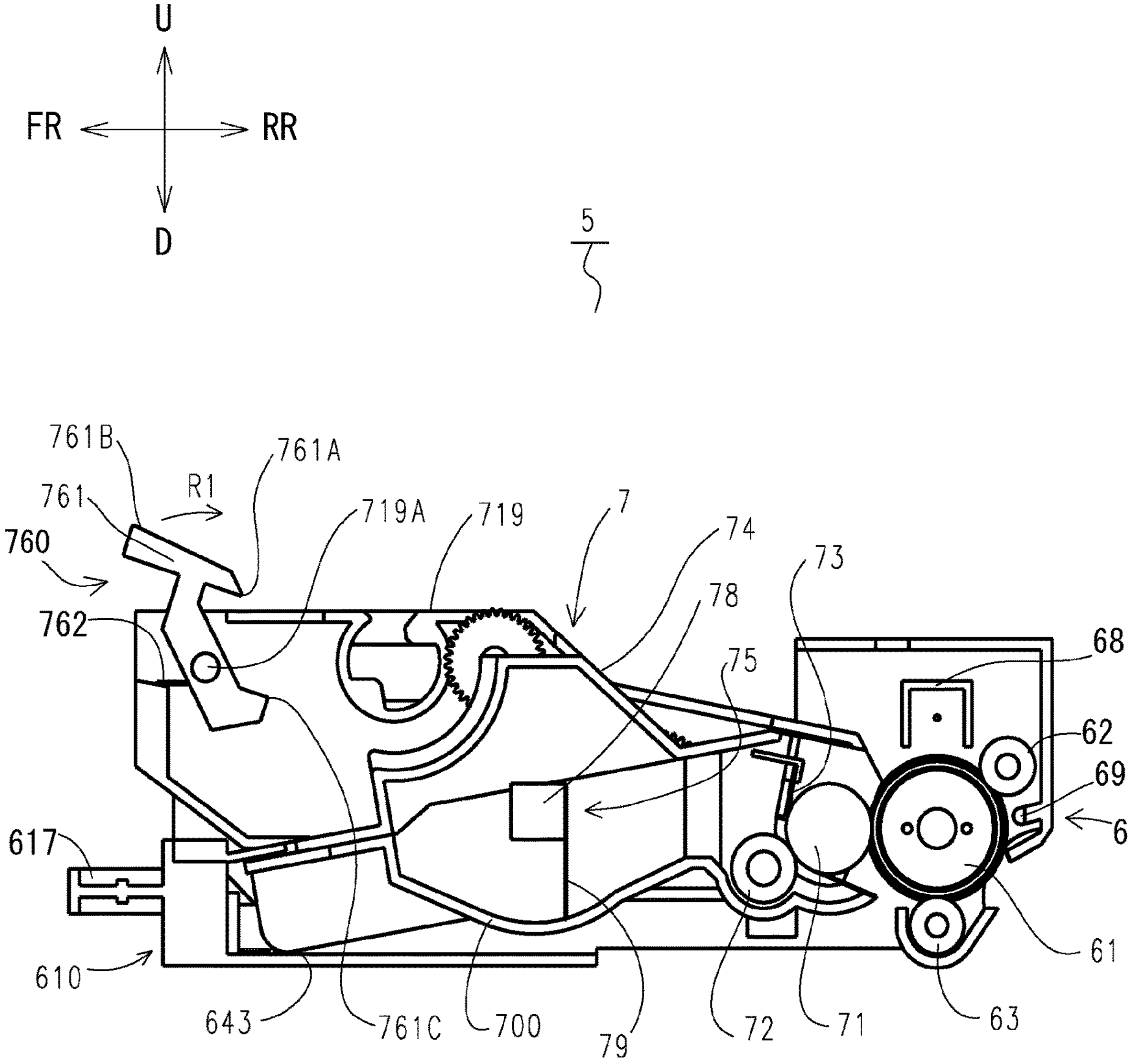
FIG. 5 is a sectional view of a process unit.

Next, an image forming process using the process unit 5 will be described. FIG. 5 is a sectional view of the process unit 5. The photosensitive member 61 is rotationally driven during execution of the image forming process. First, the surface of the photosensitive member 61 is electrically charged uniformly by the corona charger 68, and thereafter is exposed to the laser light emitted from the exposure device 4 (FIG. 1) and corresponding to the image data, so that an electrostatic latent image corresponding to the image data is formed on the photosensitive member 61.

On the other hand, the developer in the first developer storage portion 74 is stirred by the first stirring member 75 and then is supplied to the developing roller 71 through the supplying roller 72. Then, the developer supplied to the developing roller 71 enters between the developing roller 71 and the layer thickness regulating blade 73 and is carried a thin layer with certain thickness on the developing roller 71.

The developer carried on the developing roller 71 is supplied to the electrostatic latent image formed on the photosensitive member 61. By this, the developer is deposited on the electrostatic latent image and is visualized as a developer image, so that the developer image is formed on the photosensitive member 61. That is, toner is supplied to the photosensitive member 61 by the developing roller 71, so that the electrostatic latent image is developed into a toner image.

In synchronism with the above-described process unit 5, from the sheet feeding tray 31 shown in FIG. 1, the sheet S is fed by the sheet feeding portion 3 to a transfer nip between the photosensitive member 61 and the transfer roller 63. Then, in this transfer nip, the image (unfixed toner image 9 formed on the photosensitive member 61 is transferred onto the sheet S.

The sheet S on which the unfixed toner image is then fed to the fixing device 8 and is pressed and heated in a heating nip between a pressing roller 81 and a heating roller 82, so that the toner image is heated. Then, the sheet S on which the toner image is fixed is discharged onto a sheet discharge tray 22.

Incidentally, the corona charger 68 described above with reference to FIG. 5 is a charging device for electrically charging the surface of the photosensitive member 61 in a non-contact manner. A pre-exposure portion 69 includes a light-emitting diode as a light source and a light guide as a light guiding member, and guides the light, emitted from the light-emitting diode, by the light guide, so that the surface of the photosensitive member 61 is irradiated with the light. A current to be supplied to the light-emitting diode is supplied from the image forming apparatus main assembly 2A. The electric charges on the surface of the photosensitive member 61 are removed (electrically discharged) by the light irradiation of the pre-exposure portion 69. Further, to a collecting roller 62, a predetermined voltage is applied from the image forming apparatus main assembly 2A, so that the collecting roller 62 collects foreign matter, such as paper powder and dust, and a residual developer which are deposited on the surface of the photosensitive member 61.

Structure of Process Unit

Next, respective units of the process unit 5 will be described. As described above, the process unit 5 includes the photosensitive unit 6 and the developing unit 7.

Structure of Developing Unit

Figure 2:
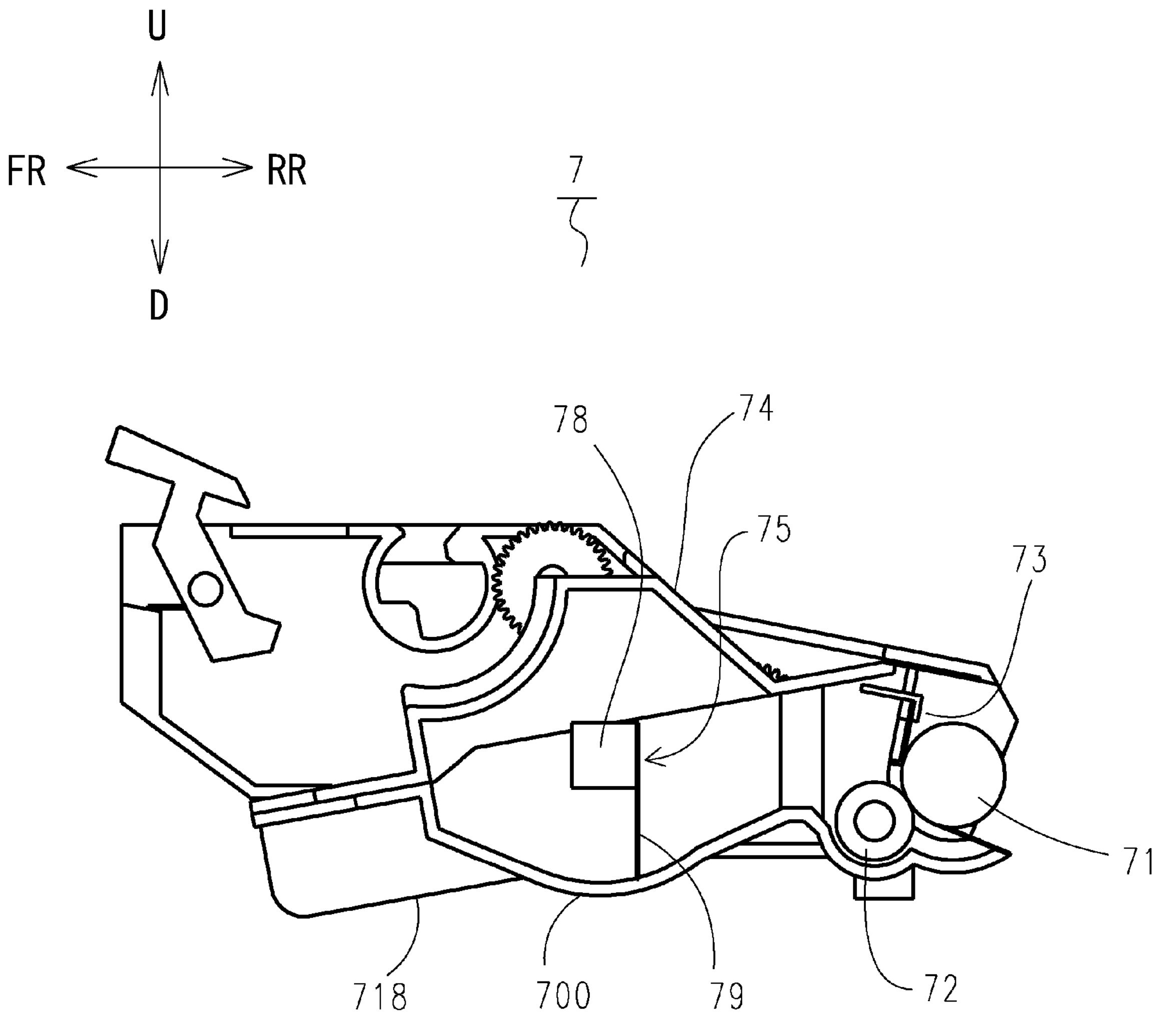
FIG. 2 is a sectional view of a developing unit.
Figure 3:
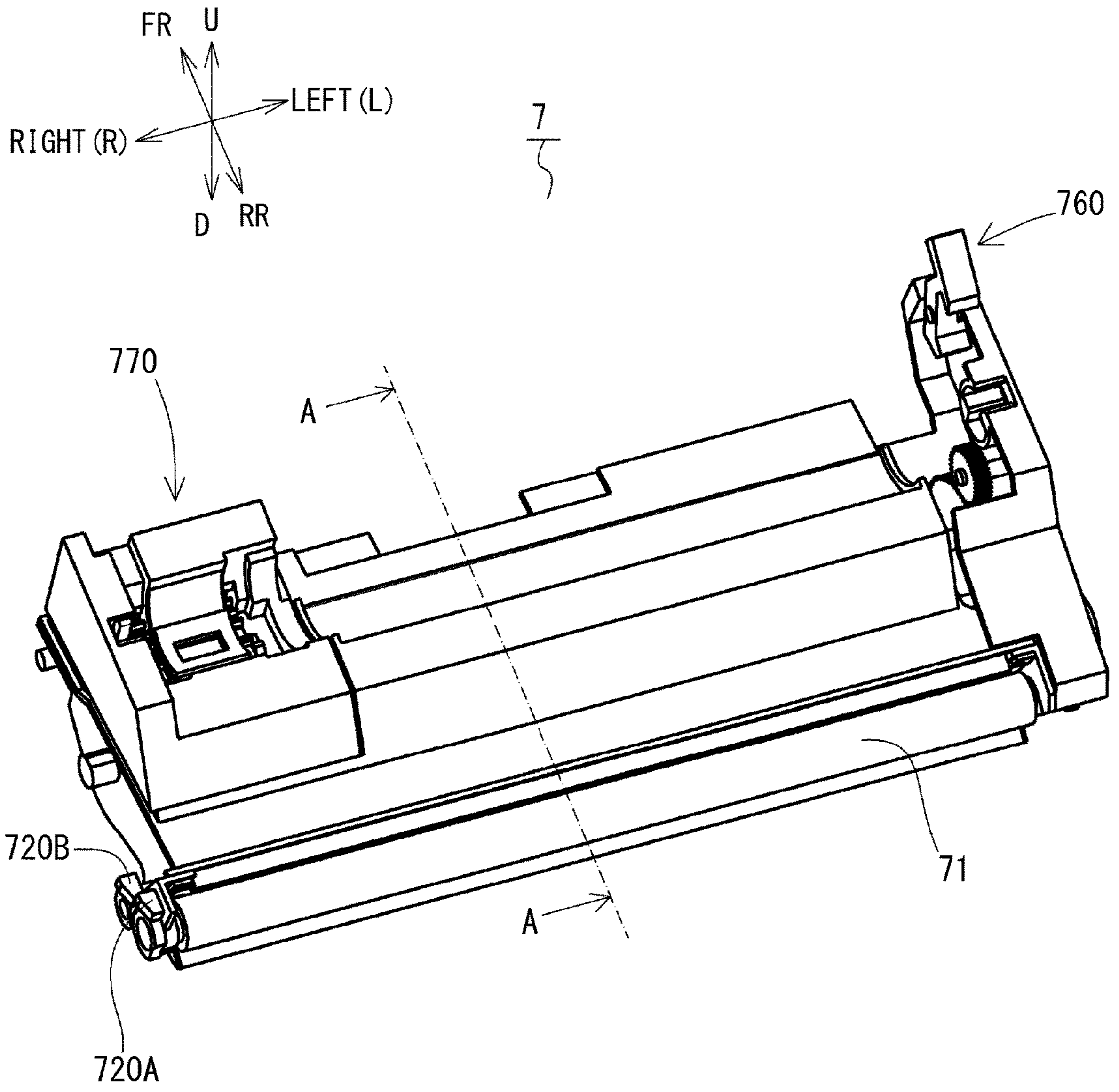
FIG. 3 is a perspective view of the developing unit.
Figure 4:
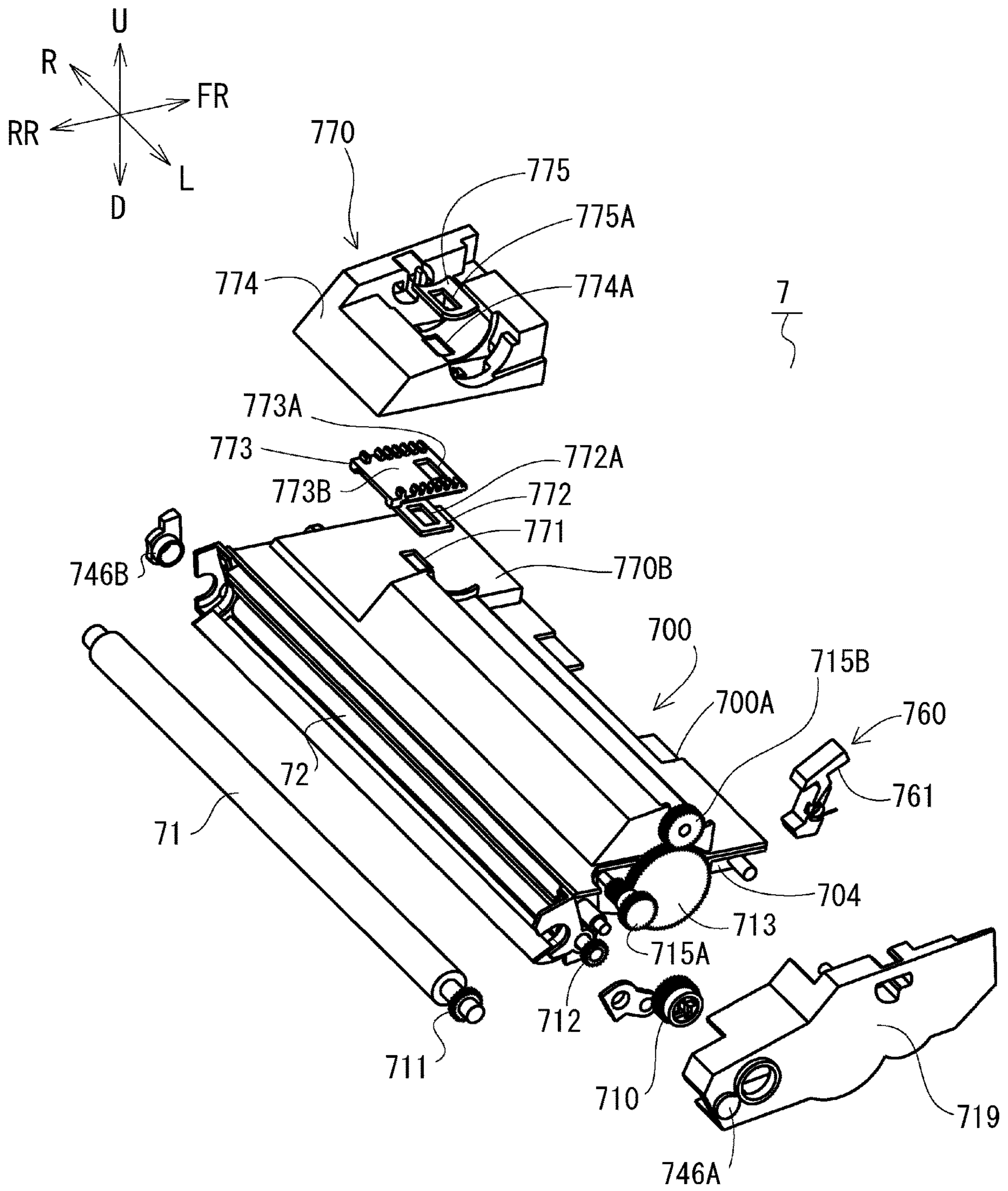
FIG. 4 is an exploded perspective view of the developing unit.
Figure 6:
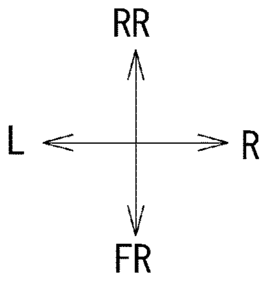
FIG. 6 is a top plan view of the developing unit.
Figure 6:
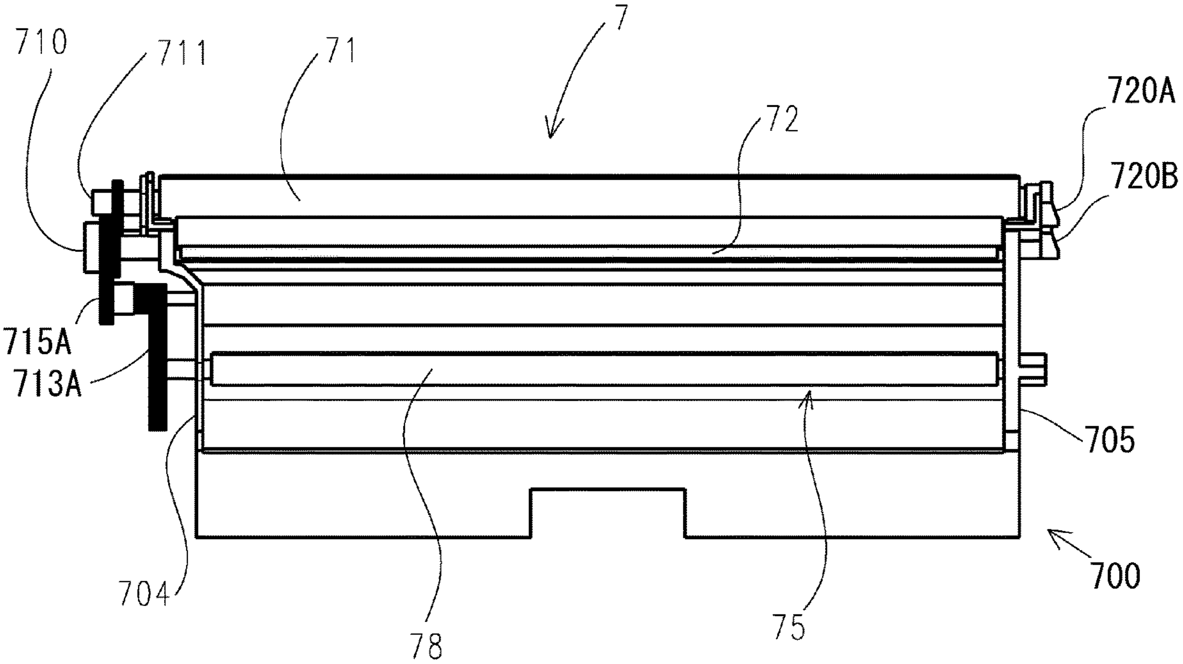
Figure 11:
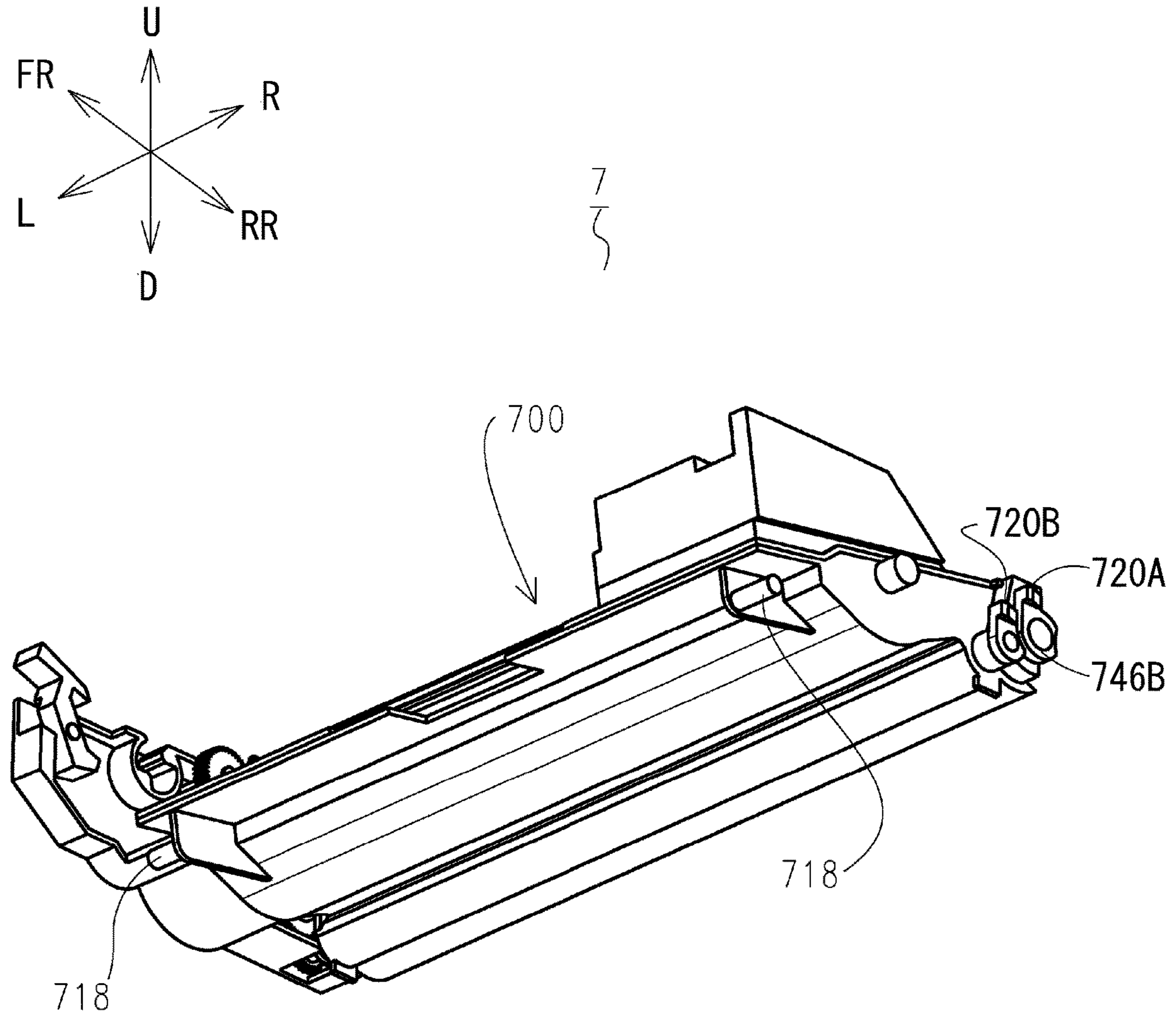
FIG. 11 is a perspective view of the developing unit as seen from below.

First, a structure of the developing unit 7 will be described. FIG. 2 is a sectional view of the developing unit 7 taken along A-A cross-section of FIG. 3. Incidentally, the A-A cross-section is parallel to the up-down direction and the front-rear direction. FIG. 3 is a perspective view of the developing unit 7. FIG. 4 is an exploded perspective view of the developing unit 7. FIG. 6 is a top plan view of the developing unit 7 and shows a state in which a top surface of a casing 700 is removed for explanation. FIG. 11 is a perspective view of the developing unit 7 as seen from below.

The developing unit 7 includes, as shown in FIG. 2, the developing roller 71 is rotatably supported at a rear portion thereof. Hereinafter, as regards the structure of the developing unit 7, description will be made by referring to a rotational axis direction of the developing roller 71 as an axial direction.

As shown in FIGS. 4 and 6, the developing roller 71, the supplying roller 72 and the first stirring member 75 are rotatably supported at their opposite end portions by a left side wall 704 and a right side wall 705 of the casing 700, respectively. Further, on a left side than the left side wall 704 of the casing 700, a developing coupling 710, a developing roller gear 711, a supplying roller gear 712, a first stirring gear 713, and D-idler gears 715A and 715B are provided. The developing roller gear 711 is fixed to an end portion of the developing roller 71, and the supplying roller gear 712 is fixed to an end portion of the supplying roller 72. Further, the first stirring gear 713 is fixed to an end portion of a first stirring bar 78 of the first stirring member 75.

Further, to the developing unit 7, the developer storage unit 9 for supplying the developer is mountable, and the developing unit 7 is provided with a developer receiving portion 770 for receiving the developer supplied by the developer storage unit 9. Further, the developing unit 7 is also provided with a lift mechanism 760 for holding and lifting up the developer storage unit 9.

As shown in FIG. 3, the developing unit 7 is provided with a first electrical contact 720A which is electrically connected to the developing roller 71 and to which a voltage to be applied to the developing roller 71 is supplied. Further, the developing unit 7 is provided with a second electrically contact 720B which is electrically connected to the supplying roller 72 and to which a voltage to be applied to the supplying roller 72 is supplied. These electrical contacts contact unshown electric power contacts provided in the image forming apparatus main assembly 2A, so that electric power is supplied to the developing roller 71 and the supplying roller 72.

Then, a driving constitution of the developing unit 7 will be described with reference to FIG. 4. In interrelation with a closing operation of the first openable member 21A (FIG. 1) provided in the image forming apparatus main assembly 2A, an unshown developing drive transmission member moves to a position for permitting engagement with a developing coupling 710. On the other hand, in interrelation with an opening operation of the first openable member 21A (FIG. 1), the developing drive transmission member (not shown) moves to a position for permitting disengagement with the developing coupling 710.

When the image forming apparatus main assembly 2A operates after the first openable member 21A (FIG. 1) is closed, a driving force is transmitted (inputted) from the developing drive transmission member (not shown) to the developing coupling 710 as a driving force receiving member. Next, the driving force is transmitted from a gear provided on a peripheral surface of the developing coupling 710 to the developing roller 71 via the developing roller gear 711 and to the supplying roller 72 via the supplying roller gear 712, so that the developing roller 71 and the supplying roller 72 are rotatable. The developing drive transmission member (not shown) is configured so as to be capable of transmitting the driving force to the developing coupling 710 while permitting a positional deviation of the developing coupling 710 within a predetermined range. The developing coupling 710, the developing roller gear 711 and the supplying roller gear 712 are restricted in movement in an axial direction thereof by a D-side holder 719 mounted on the casing 700.

As shown in FIG. 5, the developing unit 7 employs the first stirring member 75, and the developer stored in the first developer storage portion 74 is stirred by the first stirring member 75, so that the developer can be used up to the end. The first stirring member 75 includes the first stirring bar 78 and a first stirring sheet 79. Further, the first stirring member 75 is constituted so as to be rotatable by receiving the driving force from the developing coupling 710 with the first stirring gear 713 via the D-idler gear 715A (see FIG. 6). The developer existing in the neighborhood of the first stirring member 75 in the first developer storage portion 74 is stirred by the first stirring member 75 and thereafter is supplied to the supplying roller 72 side, and is further supplied to the developing roller 71 by the supplying roller 72.

[Structure of Photosensitive Unit and Support of Developing Unit]

Figure 7:
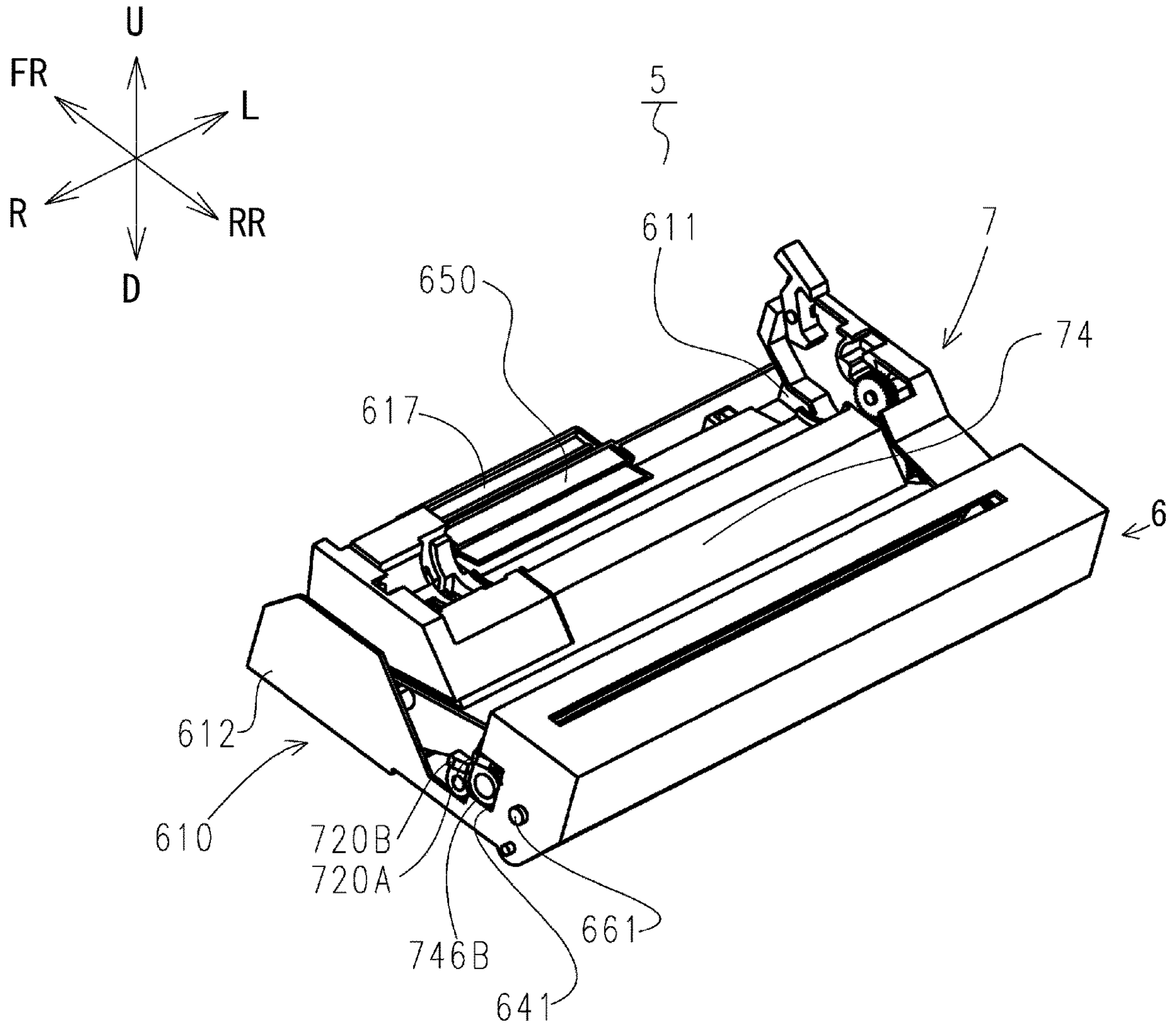
FIG. 7 is a perspective view of the process unit.
Figure 8:
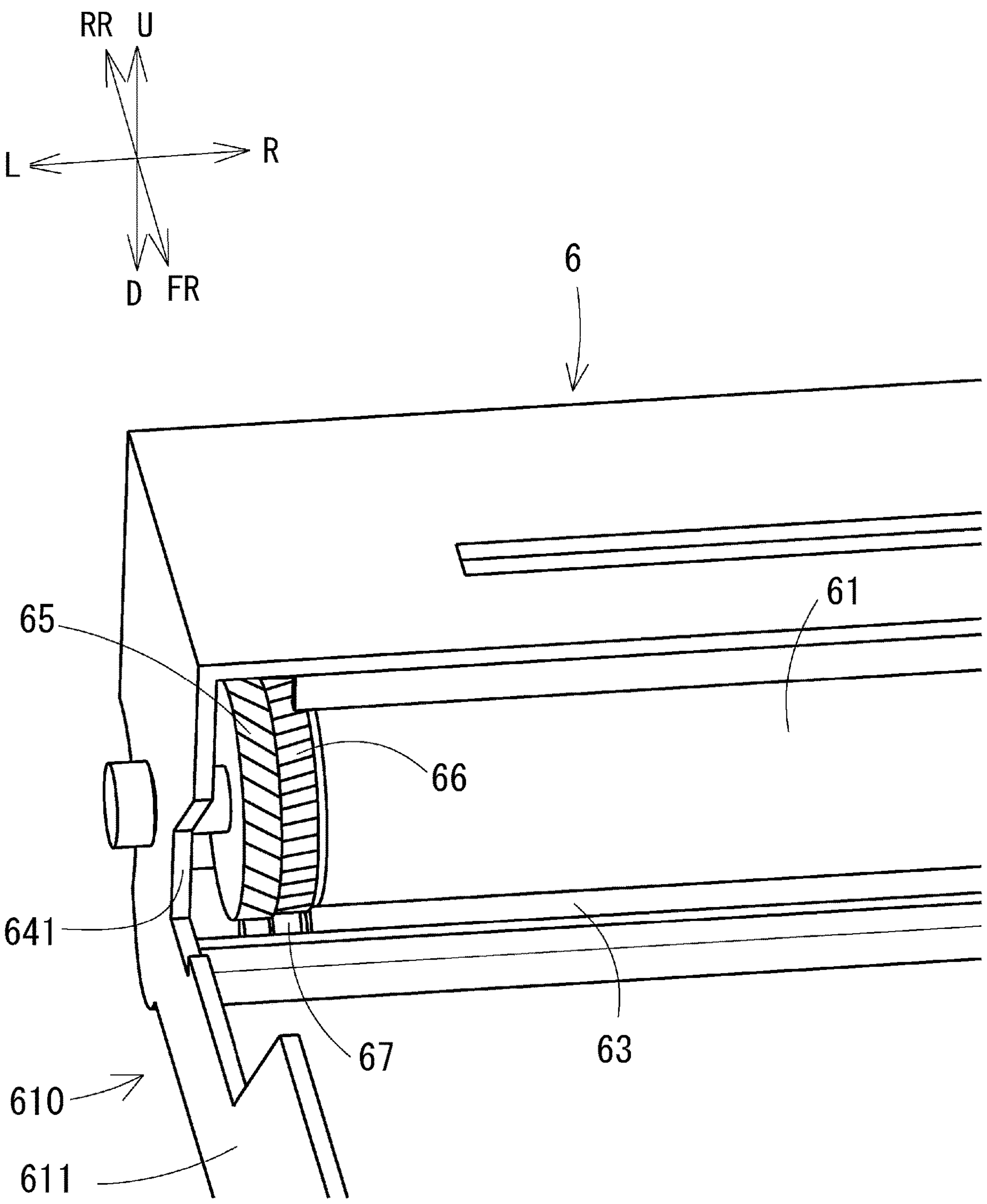
FIG. 8 is a partially perspective view of the developing unit and a photosensitive unit.
Figure 9:
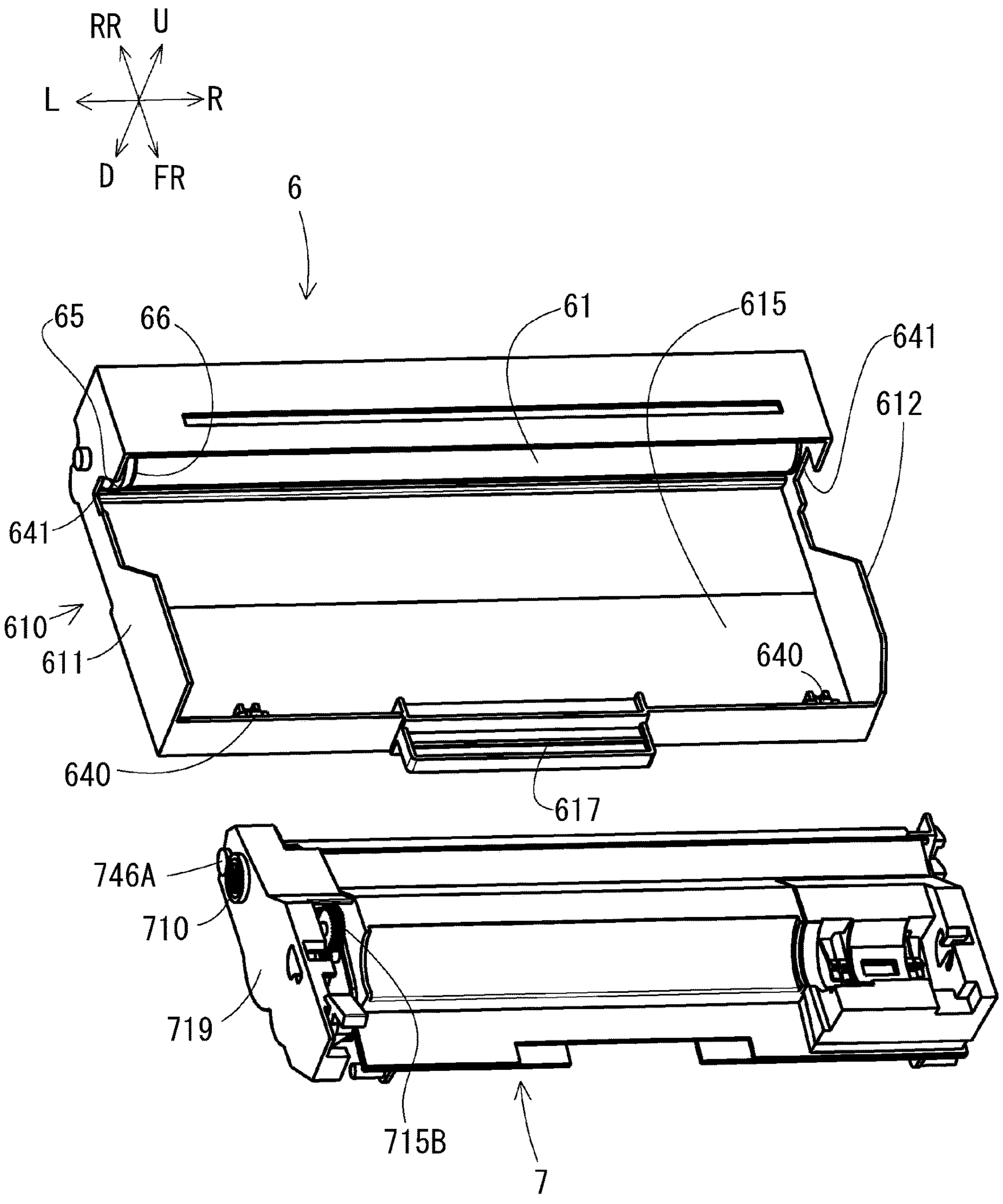
FIG. 9 is a perspective view of the developing unit and the photosensitive unit.
Figure 10:
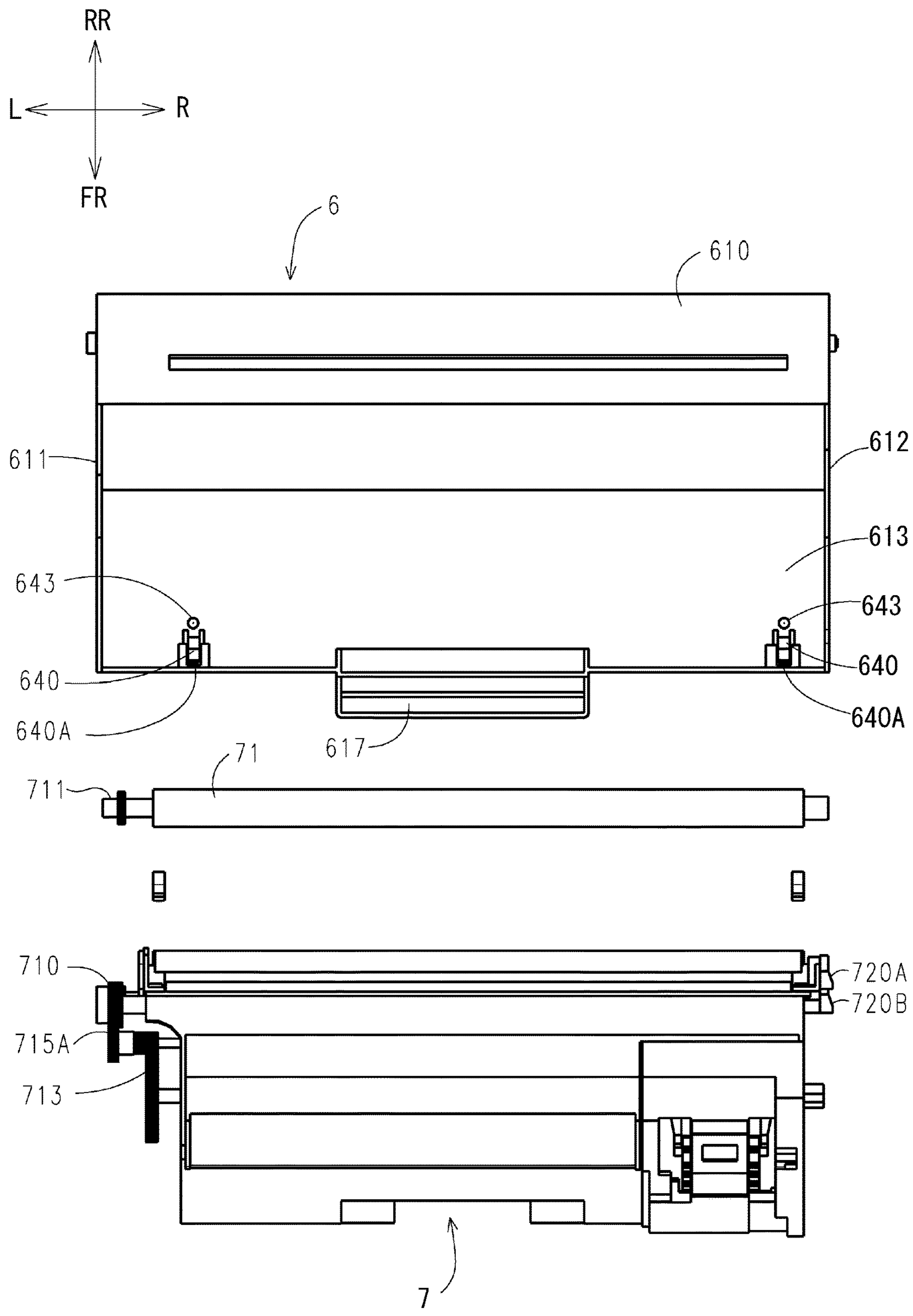
FIG. 10 is a top plan view showing a positional relationship between the photosensitive unit, the developing unit and a developing roller.

Next, a detailed structure of the photosensitive unit 6 will be described. FIG. 7 is a perspective view of the process unit 5. FIG. 8 is a partially perspective view of the photosensitive unit 6. FIG. 9 is a perspective view of the developing unit 7 and the photosensitive unit 6. FIG. 10 is a top plan view of the photosensitive unit 6, the developing unit 7 and the developing roller 71.

The photosensitive unit 6 principally includes, as shown in FIG. 9, a frame 610 provided with a pair of a left side wall 611 and a right side wall 612, and the photosensitive member 61 rotatably supported on a rear side of the frame 610. On a front side of the frame 610, a mounting portion 615 in which the developing unit 7 is mountable, a gripping portion 617 with which a user grips the photosensitive unit 6, and urging members 640 for urging the developing unit 7. Further, as shown in FIG. 7, the first developer storage portion 74 of the developing unit 7 mounted in the mounting portion 615 between the left side wall 611 and the right side wall 612 with respect to the left-right direction.

As shown in FIG. 9, the left side wall 611 and the right side wall 612 of the frame 610 are provided, in front of the photosensitive member 61, with receiving portions 641 for receiving rotation shaft receiving members 746A and 746B (FIG. 7) of the developing roller 71. Each of the receiving portions 641 includes a substantially U-shaped recessed portion which is open on the front side, and a rotation shaft (not shown) of the developing roller 71 is inserted into the recessed portions of the receiving portions 641.

Further, as shown in FIG. 10, projections 643 projecting in an upward direction are provided on a bottom surface 613 of the frame 610 at opposite end portions with respect to the left-right direction. These projections 643 movably support the developing unit 7 in contact with bosses 718 shown in FIG. 11 and provided on a bottom portion of the casing 700 of the developing unit 7.

Further, in the structure of this embodiment, as shown in FIG. 7, an urging member 650 for disabling dismounting of the developing unit 7 from the photosensitive unit 6 in a state in which the developing unit 7 is mounted to the photosensitive unit 6.

As shown in FIG. 9, the urging members 640 are provided at opposite end portions with respect to the left-right direction on a front side of the frame 610, and are urged in a direction from the front side toward the rear side by compression springs 640A (FIG. 10) as urging members. For this reason, by an urging force of the compression springs 640A (FIG. 10), the urging members 640 urge the associated bosses 718 (FIG. 11), respectively, provided on the casing 700 of the developing unit 7. The developing unit 7 is urged by the urging members 640, so that the developing roller 71 is urged toward the photosensitive member 61.

Further, as shown in FIG. 8, at a left end portion of the photosensitive member 61, a photosensitive member gear 65 and a transfer gear 66 are fixed and are configured to rotate integrally with the photosensitive member 61. When the process cartridge 10 is mounted in the image forming apparatus main assembly 2A, by engagement between a driving gear (not shown) of the image forming apparatus main assembly 2A and the photosensitive member gear 65, a driving force is transmitted to the photosensitive member 61 and the transfer gear 66, so that the photosensitive member 61 and the transfer gear 66 are in a rotatable state. Further, the transfer gear 66 engages with a transfer roller gear 67 fixed to a left end portion of the transfer roller 63, so that the transfer roller 63 is also in a rotatable state.

Structure of Developer Storage Unit

Figure 12:
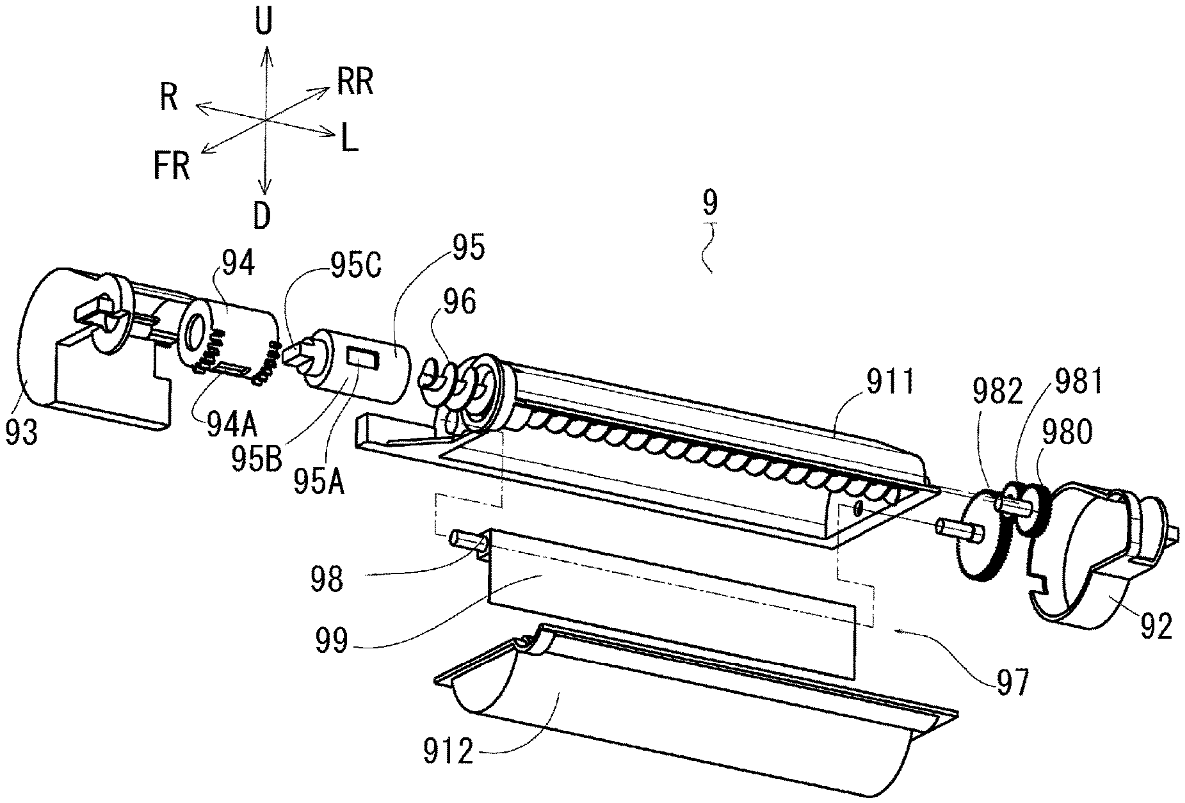
FIG. 12 is an exploded perspective view of a developer storage unit.
Figure 13:
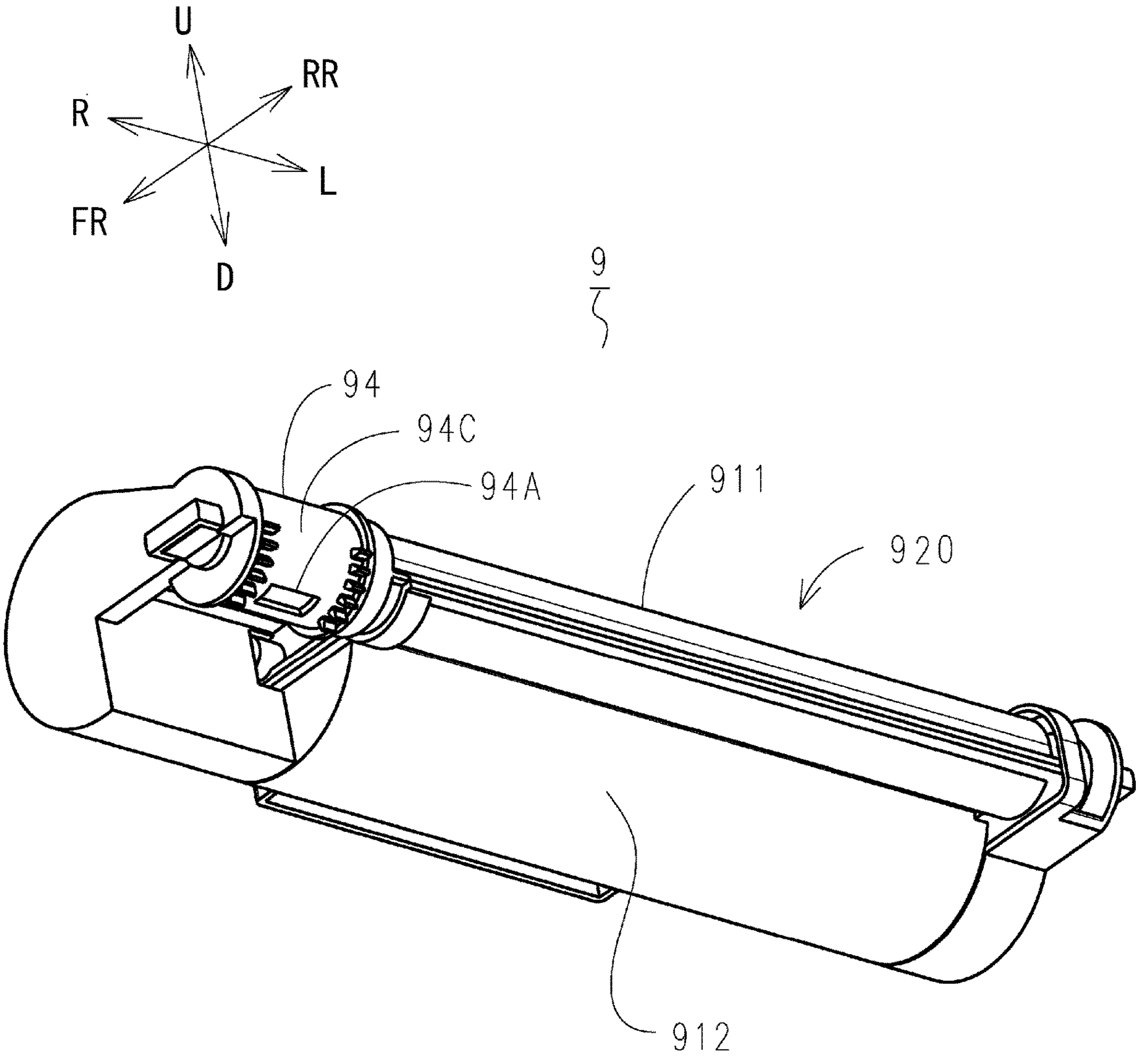
FIG. 13 is a perspective view of the developer storage unit as seen from below.

Next, a structure of the developer storage unit 9 will be described. FIG. 12 is an exploded perspective view of the developer storage unit 9, and FIG. 13 is a perspective view of the developer storage unit 9 as seen from below. Further, FIG. 14 is a sectional view of the developer storage unit 9.

The developer storage unit 9 principally includes, as shown in FIGS. 12 and 13, a container member 911, a bottom member 912, a T-side holder L92, a T-side holder R93, a discharge opening forming member 94, a discharge-side shutter 95, a feeding screw 96, and a second stirring member 97. Further, in order to transmit drive (driving force), the developer storage unit 9 includes a feeding screw gear 980, a T-idler gear 981, and a second stirring gear 982.

In this embodiment, as regards the developer storage unit 9, a storage container 920 for forming an outer surface of the developer storage unit 9 is formed by combining the container member 911, the bottom member 912, the T-side holder L92 and the T-side holder R93 which are described above, with each other. Specifically, of the storage container 920, inside a combined portion between the container member 911 and the bottom member 912, a second developer storage portion 910 as a developer storage portion for storing the developer is formed. To one end portion of the second developer storage portion 910 with respect to a longitudinal direction, the discharge opening forming member 94 is fixed. The discharge opening forming member 94 has a discharge opening forming surface 94C at an outer peripheral portion thereof, and the discharge opening forming surface 94C is provided with a developer discharge opening 94A for permitting discharge of the developer to an outside of the developer storage unit 9. This developer discharge opening 94A is a discharge opening of the storage container 920.

Figure 14:
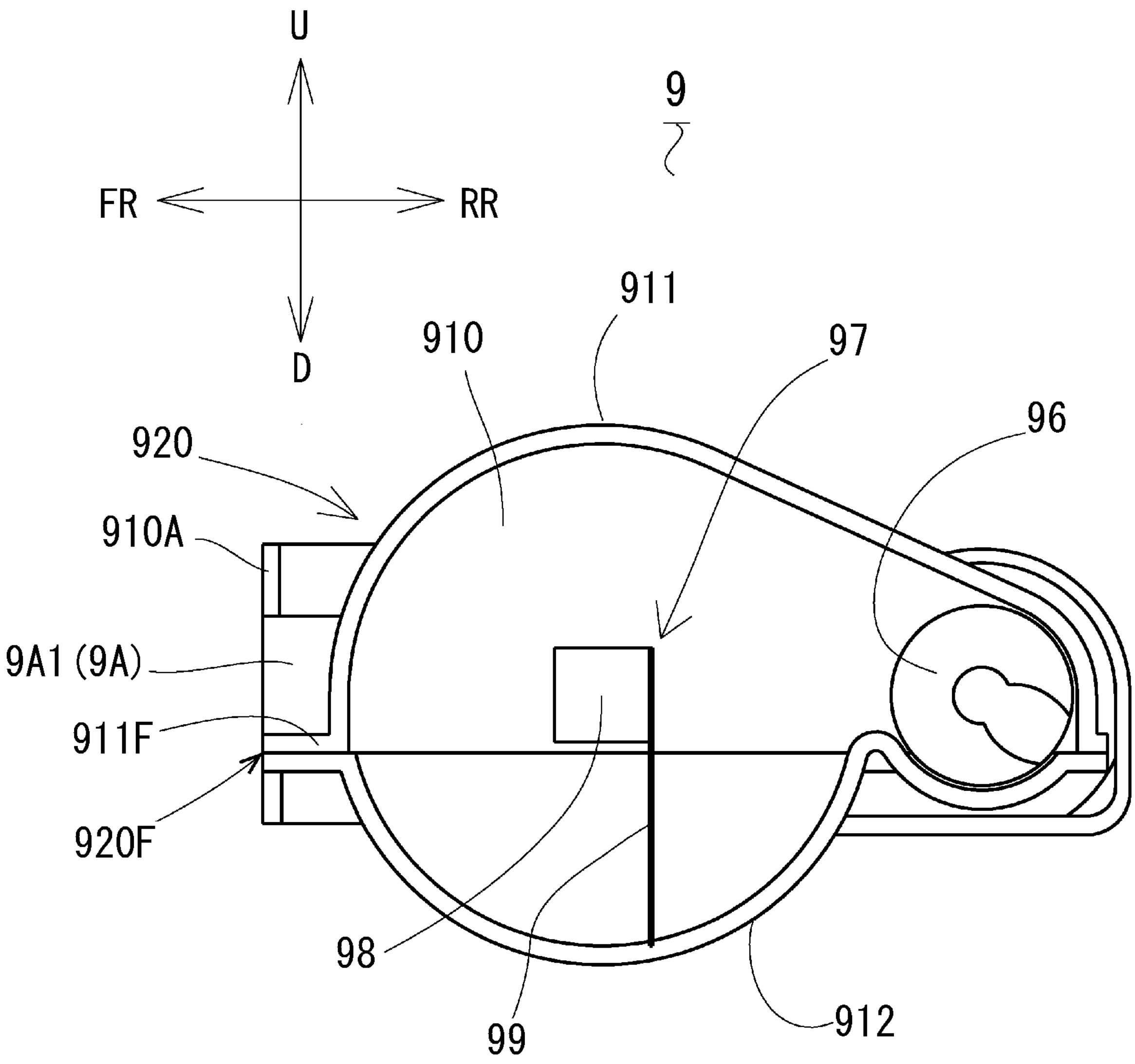
FIG. 14 is a sectional view of the developer storage unit.

Further, as shown in FIG. 14, the feeding screw 96 and the second stirring member 97 are rotatably provided inside the second developer storage portion 910. The feeding screw 96 and the second stirring member 97 are rotated by transmitting driving forces thereto by the feeding screw gear 980 and the second stirring gear 982, respectively, which are provided outside the second developer storage portion 910 (FIG. 12). The second stirring member 97 is constituted by a second stirring bar 98 and a second stirring sheet 99 similarly as in the case of the first stirring member 75. The developer stored in the second developer storage portion 910 is stirred and fed toward the feeding screw 96 by the second stirring member 97 as a stirring member, and then is fed by the feeding screw 96 toward the developer discharge opening 94A shown in FIG. 13. Then, the developer is discharged toward the process unit 5, specifically a developer receiving opening 771 of the developing unit 7 described later, through the developer discharge opening 94A.

As shown in FIG. 12, inside the discharge opening forming member 94, the discharge-side shutter 95 is provided rotatably. The discharge-side shutter 95 is provided with a developer passing hole 95A and a closed portion 95B, and the developer is capable of being discharged in the case where this developer passing hole 95A and the developer discharge opening 94A coincide with each other. On the other hand, in the case where the closed portion 95B opposes the developer discharge opening 94A, the discharge of the developer is prohibited, so that the inside developer is prevented from leaking out of the developer storage unit 9 during transportation or the like.

Support of Developer Storage Unit

Next, a support structure of the developer storage unit 9 will be described. Parts (a), (b) and (c) of FIG. 15 are perspective views of the developer storage unit 9 and the process unit 5, wherein part (a) shows a state before the developer storage unit 9 is mounted on the process unit 5, part (b) shows a state of a mounting process of the developer storage unit 9, and part (c) shows a state of completion of the mounting of the developer storage unit 9.

As shown in FIG. 15, the developer storage unit 9 is mountable on and dismountable from the process unit 5. First, the developer storage unit 9 is provided with a gripping portion 910A, formed by the container member 911 and the bottom member 912, on a front side thereof. To opposite end portions of the developer storage unit 9 with respect to the longitudinal direction, the T-side holder L92 and the T-side holder R93 are fixed. The T-side holder L92 and the T-side holder R93 are provided with a projection-to-be-supported L92A and a projection-to-be-supported R93A, respectively for being supported by the developing unit 7. Further, the developing unit 7 is provided with a supporting portion L730 and a supporting portion R731 for supporting the projection-to-be-supported L92A and the projection-to-be-supported R93A, respectively.

When the developer storage unit 9 is mounted on the process unit 5, as shown in part (a) of FIG. 15, from above the process unit 5, the developer storage unit 9 is moved in an arrow S3 direction while gripping the gripping portion 910A. The developer storage unit 9 moved in the arrow S3 direction is, as shown in part (b) of FIG. 15, in a state in which the projection-to-be-supported L92A and the projection-to-be-supported R93A are supported by the supporting portion L730 and the supporting portion R731, respectively. From this state, the developer storage unit 9 is rotated about the projection-to-be-supported L92A and the projection-to-be-supported R93A as a rotation center, so that the mounting of the developer storage unit 9 is completed as shown in part (c) of FIG. 15 and thus the process cartridge 10 is prepared.

Further, in a state in which the mounting of the developer storage unit 9 is completed, the feeding screw gear 980 of the developer storage unit 9 is capable of engaging with the D-idler gear 715B of the developing unit 7. By this, a driving force of the developing unit 7 is transmitted to the developer storage unit 9.

A lifetime of the developer storage unit 9 determined from an amount of the developer accommodated in the developer storage unit 9 is set so as to be shorter than a lifetime of the process unit 5 determined from a lifetime of the photosensitive member 61 and a lifetime of the developing roller 71. Accordingly, there is a need that only the developer storage unit 9 reaching an end of the lifetime thereof is exchanged separately from the process unit 5. In this case, the developer storage unit 9 can be exchanged only by opening only the first openable member 21A (FIG. 1), so that the user is capable of performing an exchanging operation without taking the process unit 5 out of the inside of the image forming apparatus main assembly 2A.

Open/Close Operation of Receiving-Side Shutter

An open/close operation of the receiving-side shutter will be described. Parts (a) and (b) of FIG. 16 are schematic views showing the open/close operation of a receiving-side shutter 773 of the developing unit 7, in which part (a) shows a closed state of the receiving-side shutter 773 and part (b) shows an open state of the receiving-side shutter 773.

First, as shown in FIG. 4, a developer receiving portion 770 is constituted by a developer receiving opening 771 provided at an upper surface of the casing 700, a receiving-side shutter seal 772, the receiving-side shutter 773, a receiving opening cover 774 and a connecting seal 775. The respective component parts are provided with holes 772A, 773A, 774A and 775A, respectively. The holes 772A, 774A and 775A of the receiving-side shutter seal 772, the receiving opening cover 774 and the connecting seal 775 are assembled in a coincident state with the developer receiving opening 771. Further, the receiving-side shutter 773 is provided with a shielding portion 773B in addition to the hole 773A and is assembled in a slidable (movable) state. By this sliding (movement), opening and closing of the developer receiving opening 771 are carried out.

The open/close operation of the receiving-side shutter 773 is performed, as shown in FIG. 16, in interrelation with a mounting/dismounting operation of the developer storage unit 9. Here, on an outer peripheral surface of a discharge opening forming member 94 of the developer storage unit 9, driving projections 94B are provided. Further, the receiving-side shutter 773 is provided with projections-to-be-driven 773C.

As described above, the developer storage unit 9 performs a rotation operation in the mounting process thereof on the developing unit 7 and thus shifts to a mounting completion state. Part (a) of FIG. 16 shows a state before the rotation operation of the developer storage unit 9 in the mounting process is performed, and in this state, the shielding portion 773B of the receiving-side shutter 773 opposes the developer receiving opening 771, so that the developer receiving opening 771 is closed. At this time, the driving projections 94B and the projections-to-be-driven 773C are in an engaged state.

Then, the developer storage unit 9 is rotated and is in the mounting completion state as shown in part (b) of FIG. 16. At this time, the rotation operation of the developer storage unit 9 is performed in a state in which the engagement between the driving projections 94B and the projections-to-be-driven 773Cc is maintained, and therefore, the receiving-side shutter 773 slides (moves) in interrelation with the rotation operation of the developer storage unit 9. By this, positions of the hole 773A of the receiving-side shutter 773 and the developer receiving opening 771 coincide with each other, so that the developer receiving opening 771 is in an open state.

Also, when the developer storage unit 9 is dismounted from the developing unit 7, similarly, in interrelation with the rotation operation of the developer storage unit 9, the receiving-side shutter 773 slides, so that the developer receiving opening 771 is in a closed state.

As described above, in a state in which the developer storage unit 9 is mounted on the developing unit 7, the developer receiving opening 771 is in the open state, so that reception of the developer into the developing unit 7 is enabled. On the other hand, in a state in which the developer storage unit 9 is not mounted on the developing unit 7, the developer receiving opening 771 is in the closed state, so that inclusion of a foreign matter into the developing unit 7 and leakage of the developer to the outside of the developer storage unit 9 are prevented.

[Open/Close Operation of Discharge-Side Shutter]

Next, an open/close operation of the discharge-side shutter 95 will be described. Parts (a) and (b) of FIG. 17 are schematic views showing the open/close operation of the discharge-side shutter 95 of the developer storage unit 9, in which part (a) shows a closed state of the discharge-side shutter 95 and part (b) shows an open state of the discharge-side shutter 95.

As described above, in the case where the positions of the developer discharge opening 94A of the discharge opening forming member 94 shown in FIG. 12 and the developer passing hole 95A of the discharge-side shutter 95 coincide with each other, the developer discharge opening 94A is in the open state. Further, in the case where the closed portion 95B of the discharge-side shutter 95 opposes the developer discharge opening 94A, the developer discharge opening 94A is in the closed state. Also, the open/close operation of the discharge-side shutter 95 is performed, similarly as the open/close operation of the receiving-side shutter 773 described above, in interrelation with the rotation operation of the developer storage unit 9 during the mounting/dismounting of the developer storage unit 9.

As shown in FIG. 17, the discharge-side shutter 95 is provided with a projection-to-be-locked 95C, which is disposed inside a projection-to-be-supported R93A with respect to a radial direction. Further, the supporting portion R731 of the developing unit 7 is provided with a locking portion 731A and a cut-away portion 731B.

Part (a) of FIG. 17 shows a state before the rotation operation of the developer storage unit 9 in the mounting process is performed. In this state, the closed portion 95B of the discharge-side shutter 95 and the developer discharge opening 94A oppose each other, and therefore, the developer discharge opening 94A is in the closed state (see also FIG. 12 in combination). At this time, the projection-to-be-locked 95C is in a sandwiched state by the locking portion 731A, so that a state in which the rotation operation of the discharge-side shutter 95 relative to the developing unit 7 is restricted is formed.

Then, the developer storage unit 9 is rotated and is in the mounting completion state as shown in part (b) of FIG. 17. At this time, the developer storage unit 9 is rotated relative to the developing unit 7 in a state in which the rotation operation of the discharge-side shutter 95 is restricted. Here, the projection-to-be-supported R93A is capable of entering the cut-away portion 731B, and therefore, rotation of the developer storage unit 9 except for the discharge-side shutter 95 is not inhibited.

From the above, by the rotation operation of the developer storage unit 9 in the mounting process, the discharge-side shutter 95 is rotated inside the developer storage unit 9 relative to the developer storage unit 9. By this, the positions of the developer passing hole 95A (FIG. 12) of the discharge-side shutter 95 and the developer discharge opening 94A (FIG. 12) coincide with each other, so that the developer discharge opening 94A (FIG. 12) is in the open state.

Also, when the developer storage unit 9 is dismounted from the developing unit 7, similarly, the discharge-side shutter 95 is rotated in interrelation with the rotation operation of the developer storage unit 9, so that the developer discharge opening 94A (FIG. 12) is in the closed state.

Lift Mechanism of Developer Storage Unit

Then, a lift mechanism 760 of the developer storage unit 9 will be described. Parts (a), (b) and (c) of FIG. 18 show an operation of the lift mechanism 760 in a process in which the developer storage unit 9 is mounted, in which part (a) shows a state in which the developer storage unit 9 is placed on the lift mechanism 760 in the mounting process, part (b) shows a state in which the developer storage unit 9 opens the lift mechanism 760 in the mounting process, and part (c) shows a state in which the mounting of the developer storage unit 9 is completed.

Parts (a), (b) and (c) of FIG. 19 show an operation in which the developer storage unit 9 in the mounted state is shifted to a lift-up state by the lift mechanism 760, in which part (a) shows a state in which the mounting of the developer storage unit 9 is completed, part (b) shows a state in which the developer storage unit 9 is lifted up by the lift mechanism 760, and part (c) shows a state in which the developer storage unit 9 is in the lift-up state. Incidentally, in FIG. 19, for explanation, the D-side holder 719 of the developing unit 7 is omitted.

As shown in FIG. 19, the T-side holder L92 of the developer storage unit 9 is provided with a projection 92B, and the projection 92B includes a contact surface 92C, a holding surface 92D and a receiving surface 92E. Further, as shown in FIG. 5, the lift member 760 is constituted by a boss 719A provided on the D-side holder 719 of the developing unit 7, a lift member 761 and a torsion coil spring 762. The lift member 761 and the torsion coil spring 762 are mounted on the boss 719A and are rotatable about the boss 719A. The lift member 761 includes a contact portion 761A, an operating portion 761B and a lifting portion 761C. Further, the lift member 761 is urged in an arrow R1 direction by the torsion coil spring 762.

First, motion of the lift mechanism 760 in the mounting process of the developer storage unit 9 will be described using FIG. 18. When the rotation operation of the developer storage unit 9 in the mounting process is gradually performed, as shown in part (a) of FIG. 18, the contact surface 92C and the contact portion 761A contact each other, so that the developer storage unit 9 is in a state in which the developer storage unit 9 is placed on the lift member 760. Then, when the rotation operation of the developer storage unit 9 is further continued, as shown in part (b) of FIG. 18, the lift member 761 is rotated in the arrow R2 direction by being pushed by the contact surface 92C, so that the rotation operation of the developer storage unit 9 is permitted. Then, when the mounting of the developer storage unit 9 is completed by further continuation of the rotation operation, as shown in part (c) of FIG. 18, the contact portion 761A is detached from the contact surface 92C. The lift member 761 is rotated in the arrow R1 direction by an urging force of the torsion coil spring 762, so that the contact portion 761A contacts the holding surface 92D. Thus, by the lift member 761, the developer storage unit 9 can be maintained in the mounting completion state.

Next, motion of a shift of the developer storage unit 9 from the mounting completion state to the lift-up state will be described using FIG. 19. As shown in part (a) of FIG. 19, in the mounting completion state of the developer storage unit 9, the contact portion 761A of the lift member 761 contacts the holding surface 92D, so that the developer storage unit 9 cannot be dismounted. In order to dismount the developer storage unit 9, as shown in part (b) of FIG. 19, the operating portion 761B of the lift member 761 is operated, so that the lift member 761 is rotated in the arrow R2 direction. By this, the lifting portion 761C of the lift member 761 contacts the receiving surface 92E, so that the developer storage unit 9 can be rotated. Thereafter, when the operating portion 761B is opened, as shown in part (c) of FIG. 19, the lift member 761 is rotated in the arrow R1 direction by the urging force of the torsion coil spring 762. A state in which the contact surface 92C and the contact portion 761A contact each other is formed, so that the developer storage unit 9 is in the lift-up state in which the developer storage unit 9 is placed on the lift mechanism 760. By this, the developer storage unit 9 can be dismounted.

Adapting Portion

Next, an adapting portion 9A will be described. FIG. 20 is a sectional view showing a state in which the process cartridge 10 is mounted in a second image forming apparatus 1B which does not adapt to the process cartridge 10. As shown in FIGS. 14 to 16, on the front side of the developer storage unit 9, the adapting portion 9A which is a projection provided on an outer (peripheral) surface of the developer storage unit 9 is formed integrally with the container member 911 of the storage container 920.

Specifically, as regards the storage container 920, with respect to a direction perpendicular to a rotational axis direction of the second stirring member 97, a matching surface between the container member 911 and the bottom member 912 is formed in a flange shape at an edge portion 920F on a side opposite from the developer discharge opening 94A with respect to the second stirring member 97. At this edge portion (front edge) 920F, as shown in part (c) of FIG. 15, the gripping portion 910A is formed at a central portion thereof. Further, the adapting portion 9A is formed by a plurality of projections 9A1 arranged in a comb-teeth shape along the rotational axis direction from an upper surface of a flange portion 911F of the container member 911 of the front edge 920F.

That is, the adapting portion (portion-to-be-discriminated) 9A is provided on the side opposite from the developer discharge opening (discharge open) 94A with respect to the rotational axis direction of the second stirring member (stirring member) 97 while sandwiching the second stirring member 97 between itself and the developer discharge opening 94A. Further, it can be said that the adapting portion 9A is provided on the outer surface, of the developer storage unit 9, opposite from an outer surface of the developer storage unit 9 opposing the photosensitive member 61 with respect to a direction perpendicular to the rotational axis direction of the photosensitive member 61.

Incidentally, the plurality of projections 9A1 are disposed on both sides of the flange portion 911F while sandwiching the gripping portion 910A therebetween. Further, a part of the projections juxtaposed with the gripping portion 910A is disposed with intervals, with adjacent projections, which are not certain spaces.

The adapting portion 9A engaged with a main assembly-side adapting portion provided in the image forming apparatus main assembly in which the process cartridge 10 in which the process unit 5 and the developer storage unit 9 are integrally assembled is mounted, so that combination adaptability of the process cartridge 10 to the image forming apparatus main assembly is ensured. For example, in the case of the first image forming apparatus 1A shown in FIG. 1, a main assembly-side adapting portion 21A1 is provided on the first openable member 21A as an openable cover member for covering a mounting space 2S in which the process cartridge 10 is mounted. Specifically, of surfaces of the first openable member 21A, the main assembly-side adapting portion 21A1 is provided on an inner surface of the first openable member 21A facing the process cartridge 10 in the closed state. The image forming apparatus 1A is a normal combination, with the developer storage unit 9, as a combination such that the developer storage unit 9 is mounted in the image forming apparatus 1A, and therefore, even when the first openable member 21A is closed, the adapting portion 9A engages with the corresponding main assembly-side adapting portion 21A1, so that the first openable member 21A is kept in the closed state as it is.

On the other hand, as shown in FIG. 20, in the case of the second image forming apparatus 1B, when a second openable member 21B is intended to be closed, the adapting portion 9A interferes with the second openable member 21B during the closing operation, so that the second openable member 21B cannot be closed to the closed state. By this, the user is capable of recognizing that a combination of the developer storage unit 9 and a second image forming apparatus main assembly 2B is not a normal combination. Particularly, the second openable member 21B is not physically closed, and therefore, the user can visually discriminate that an erroneous developer storage unit/process cartridge is mounted. Further, in addition, the second image forming apparatus 1B is set so that the image forming operation cannot be performed in a state in which the second openable member 21B is not closed. Also, by this setting, the user is capable of discriminating erroneous mounting of the developer storage unit 9.

Further, as shown in part (b) of FIG. 16, the adapting portion 9A is provided so that the developer storage portion 910 is positioned between the photosensitive member 61 and the adapting portion 9A with respect to the direction perpendicular to the rotational axis direction of the photosensitive member 61 in a state in which the developer storage unit 9 is mounted on the process unit 5. In other words, where the developer storage unit 9 is mounted in the process unit 5, the adapting portion 9A is provided on the above-described edge portion 920F of the storage container 920 positioned on a side opposite from the photosensitive member 61 with respect to the direction perpendicular to the rotational axis direction of the second stirring member 97. By providing the adapting portion 9A in this manner, the adapting portion 9A is disposed on an upstream side of the process cartridge 10 with respect to the mounting direction S1 (FIG. 1) and is in a position of the process cartridge 10 close to the user. Thus, by provision of the adapting portion 9A at the position close to the user, the user easily discriminates that the developer storage unit 9 is erroneously mounted.

As in this embodiment, an embodiment such that the process cartridge 10 is mounted in the apparatus main assembly 2A of the image forming apparatus 1A along the mounting direction S1 which is the direction perpendicular to the rotational axis direction of the photosensitive member 61 and the developer storage unit 9 is provided on the upstream side of the mounting direction S1 is employed in some instances. In such an embodiment, it would be considered that the adapting portion is constituted so as to be different from the adapting portion in this embodiment and is provided on a frame constituting the photosensitive unit 6 or a frame constituting the developing unit 7. However, in the case where the adapting portion is provided on the frame constituting the photosensitive unit 6 or the frame constituting the developing unit 7, there is a need to provide the developer storage unit 9 while avoiding the adapting portion. As a result, there are liabilities that the provision of the adapting portion constitutes a constraint on a degree of freedom of a shape of the developer storage unit 9 and that the provision of the adapting portion constitutes a constraint on an increase in volume of the developer storage unit 9.

On the other hand, the adapting portion 9A is provided on the developer storage unit 9 as in this embodiment, whereby the degree of freedom of the shape of the developer storage unit 9 can be improved. Further, as a result, it becomes possible to increase the volume of the developer storage unit 9. In other words, it can be said that the developer storage unit 9 is a developer storage unit which includes the discharge opening for permitting the discharge of the stored developer to the process unit 5 and which is constituted so as to be mountable in and dismountable from the process unit 5. Further, it can be said that the first openable member 21A of the image forming apparatus 1A is an openable member for opening and closing the opening 2S permitting passing of the process cartridge 10 when the process cartridge (cartridge) 10 is mountable in and dismountable from the image forming apparatus main assembly 2A. Further, it can be said that the main assembly-side adapting portion 21A1 is a discriminating portion provided on this openable member 21A, and it can be said that the adapting portion 9A is a portion-to-be-discriminated engaging with the discriminating portion when the process cartridge 10 is mounted in the image forming apparatus main assembly 2A. Further, the developer storage unit 9 includes the portion-to-be-discriminated 9A, and therefore, there is no need to avoid the portion-to-be-discriminated 9A when the developer storage unit 9 is designed, so that a degree of freedom of design of the developer storage unit 9 is improved.

In addition, each of a plurality of projections 9A1 forming the adapting portion (portion-to-be-discriminated) 9A projects from an outer surface of the developer storage unit 9 and an inside thereof has a hollow shape. The hollow space of each projection 9A1 is not only connected to the developer storage portion 910 but also a space for accommodating the developer. For this reason, an amount of the developer capable of being accommodated in the developer storage unit 9 can be made larger.

Further, in the case where specifications of the process cartridge 10 are changed depending on a kind of the image forming apparatus, a kind of the developer supported in the developer storage unit 9 is changed and a storage amount of the developer is changed by changing a shape of the developer storage unit 9 in some instances. At this time, when the adapting portion is constituted so as to be different from that in this embodiment and is provided on the frame constituting the photosensitive unit or the developing unit 7, an object to be changed is not only the developer storage unit 9 but also the photosensitive unit or the developing unit 7. Accordingly, there is a possibility that a manufacturing stop of the process cartridge becomes complicated.

On the other hand, by providing the adapting portion 9A on the developer storage unit 9 as in this embodiment, complication of the manufacturing step of the process cartridge can be suppressed.

Incidentally, in this embodiment, an example in which the adapting portion is formed integrally with the container member 911 was described, but the adapting portion may also be formed integrally with another component part (for example, the bottom member 912, the T-side holder R93, or the like) constituting the developer storage unit 9. Further, the adapting portion 9A is prepared as a single component part and may also be fixed to a component part (for example, the container member 911, the bottom member 912, the T-side holder R93, or the like). That is, the adapting portion 9A may only be required to be provided on the outer (peripheral) surface of the developer storage unit 9, and may only be required to be provided on the storage container 920 forming the outer configuration of the developer storage unit 9 irrespective of an integral form and a separate form in which the adapting portion 9A is mounted as a separate component part.

Further, functions, materials, shapes, relative arrangement and the like of constituent elements described in this embodiment are not intended such that the scope of the present invention is limited thereto unless otherwise specified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-086877 filed on Apr. 26, 2019, which is hereby incorporated by reference herein in its entirety.

What is claimed is:

1. A cartridge attachable to a main assembly of an image forming apparatus in an attaching direction and detachable from the main assembly in a detaching direction, the main assembly including a discriminating portion, the cartridge comprising:

a photosensitive drum;

a frame configured to support the photosensitive drum so that the photosensitive drum is rotatable about a rotational axis extending in a direction intersecting with the attaching direction;

a developing unit that is attached to the frame and that includes a developing roller configured to supply a developer to the photosensitive drum and a developer accommodating portion configured to accommodate the developer to be borne on the developing roller; and a developer storage unit including a developer storage portion configured to store the developer, wherein the developer storage portion is provided with a discharge opening configured to allow discharge of the developer stored in the developer storage portion to the developer accommodating portion and is detachably attached to the developing unit, and wherein the developer storage unit is provided with a portion-to-be-discriminated which is configured to engage with the discriminating portion of the main assembly when the cartridge is attached to the main assembly and which is provided farther from the photosensitive drum in the detaching direction than an end of the frame located farthest downstream in the detaching direction.

2. The cartridge according to claim 1, wherein the main assembly includes an opening portion, through which the cartridge passes while being mounted to and dismounted from the main assembly, and an openable member, which is movable between an open position where the openable member is opened to expose the opening portion and a closed position where the openable member is closed to cover the opening portion, the openable member including the discriminating portion, and wherein the portion-to-be-discriminated is engaged with the discriminating portion of the openable member when the cartridge is attached to the main assembly and the openable member is in the closed position.

3. The cartridge according to claim 1, wherein the developer storage unit includes a stirring member which is configured to stir the developer in the developer storage portion and which is provided in the developer storage portion, and wherein the portion-to-be-discriminated is provided on a side of the developer storage portion opposite from the discharge opening with respect to the stirring member in the attaching direction.

4. The cartridge according to claim 1, wherein the portion-to-be-discriminated is provided on an outer surface of the developer storage portion on a side opposite from an outer surface of the developer storage portion opposing the photosensitive drum in the attaching direction.

5. The cartridge according to claim 1, wherein the developer storage unit includes a grip portion on an outer surface of the developer storage portion, and wherein the portion-to-be-discriminated is provided on the outer surface of the developer storage portion and is aligned with the grip portion in a direction of the rotational axis.

6. The cartridge according to claim 1, wherein the portion-to-be-discriminated includes a plurality of protrusions that protrude from the outer surface of the developer accommodating portion and that are aligned in the direction of the rotational axis at intervals from one another.

7. The cartridge according to claim 6, wherein inside each of the plurality of protrusions, there is a space configured to store the developer.

8. The cartridge according to claim 1, wherein the developer storage unit includes a shutter configured to move between a first position where the shutter closes the discharge opening and a second position where the shutter opens the discharge opening, wherein the developer storage unit has a first posture and a second posture with respect to the developing unit while the developer storage unit is being attached to the developing unit, the first posture being a posture to which the developer storage unit is transitioned by being moved in a direction perpendicular to the rotational axis, the second posture being a posture to which the developer storage unit is transitioned from the first posture by being rotated about a second rotational axis extending in the direction of the rotational axis of the stirring member, and wherein the shutter is moved from the first position to the second position by a transition of the developer storage unit from the first posture to the second posture, and wherein the portion-to-be-discriminated of the developer storage unit having the second posture is configured to engage with the discriminating portion of the main assembly when the cartridge is attached to the main assembly.

* * * * *